US012618983B2

(12) United States Patent
Garin

(10) Patent No.: US 12,618,983 B2
(45) Date of Patent: May 5, 2026

(54) METHODS AND SYSTEMS FOR EXCESS PATH LENGTH CORRECTIONS FOR GNSS RECEIVERS

(71) Applicant: oneNav, Inc., Sunnyvale, CA (US)

(72) Inventor: Lionel Garin, Palo Alto, CA (US)

(73) Assignee: oneNav, Inc., Sunnyvale, CA (US)

( * ) Notice: Subject to any disclaimer, the term of this patent is extended or adjusted under 35 U.S.C. 154(b) by 493 days.

(21) Appl. No.: 18/106,410

(22) Filed: Feb. 6, 2023

(65) Prior Publication Data

US 2023/0393287 A1    Dec. 7, 2023

Related U.S. Application Data

(60) Provisional application No. 63/415,245, filed on Oct. 11, 2022, provisional application No. 63/365,710, filed on Jun. 2, 2022.

(51) Int. Cl.
*G01S 19/41* (2010.01)
*G01S 19/39* (2010.01)

(52) U.S. Cl.
CPC ............ *G01S 19/41* (2013.01); *G01S 19/396* (2019.08)

(58) Field of Classification Search
CPC ........ G01S 19/22; G01S 19/428; G01S 19/41; G01S 19/396
See application file for complete search history.

(56) References Cited

U.S. PATENT DOCUMENTS 9,562,770 B2    2/2017   Garin
2009/0213006 A1    8/2009   Nayyar et al.

2016/0146945 A1    5/2016   Kamijo et al.
2017/0131409 A1    5/2017   Irish et al.
2020/0326430 A1    10/2020  Nichols et al.
(Continued)

FOREIGN PATENT DOCUMENTS

WO    2020248200 A1    12/2020
WO    2021029869 A1    2/2021

OTHER PUBLICATIONS

Lyu, Zhitao et al. A New Method for Non-line-of-sight GNSS Signal Detection for Positioning Accuracy Improvement in Urban Environments. In Proceedings of the 33rd International Technical Meeting of the Satellite Division of The Institute of Navigation (ION GNSS+ 2020), Sep. 2020, 17 pages, DOI:10.33012/2020.17662.

(Continued)

*Primary Examiner* — Justin S Lee
(74) *Attorney, Agent, or Firm* — WOMBLE BOND DICKINSON (US) LLP

(57) ABSTRACT

Methods and systems for estimating and using excess path length (EPL) corrections in GNSS receivers are described. A method can estimate the EPLs using a selection of line of sight and non line of sight pseudorange measurements, and these EPLs can be used to correct non selected non-line of sight pseudoranges. In one embodiment, a cloud based system can receive data from a crowd source set of EPL corrections (e.g., from GNSS receivers in an urban canyon environment) and then can develop a crowd sourced set of EPL corrections and then provide to GNSS receivers (some of which may part of the crowd of GNSS receivers) the crowd sourced set of EPL corrections. The EPL corrections can be used to improve position solutions in, for example, an urban canyon.

9 Claims, 12 Drawing Sheets

(56)                References Cited

U.S. PATENT DOCUMENTS

| | | |
|---|---|---|
| 2021/0239848 A1 | 8/2021 | Karvounis et al. |
| 2021/0325548 A1 | 10/2021 | Garin et al. |
| 2021/0373179 A1 | 12/2021 | McBurney et al. |
| 2022/0066041 A1* | 3/2022 | Khider .................... G01S 19/37 |
| 2022/0066046 A1* | 3/2022 | Diggelen ............. G01S 19/428 |
| 2022/0066048 A1 | 3/2022 | Diggelen et al. |
| 2022/0099841 A1* | 3/2022 | Farmer ................... G01S 19/22 |
| 2022/0137236 A1 | 5/2022 | Conflitti et al. |
| 2023/0050047 A1 | 2/2023 | Maaref et al. |

OTHER PUBLICATIONS

Suzuki, T. et al. NLOS multipath detection using convolutional neural network. In Proceedings of the 33rd International Technical Meeting of the Satellite Division of the Institute of Navigation, (ION GNSS+ 2020), Sep. 2020, pp. 2989-3000, DOI: 10.33012/2020.17663.

Teunissen, Peter and Montenbruck, Oliver, editors. "Combination of Observations", Chapter 20, Springer Handbook of Global Navigation Satellite Systems (1st. ed.). Springer Publishing Company, Incorporated, 2017, pp. 583-604.

U.S. Appl. No. 63/362,931, filed Apr. 13, 2022, 40 pages.

PCT International Search Report and Written Opinion from related PCT Application No. PCT/US2023/023889, mailed Oct. 23, 2023 (15 pages).

A. A. Abdallah and Z. M. Kassas, "Deep Learning-Aided Spatial Discrimination for Multipath Mitigation," 2020 IEEE/ION Position, Location and Navigation Symposium (PLANS) (Apr. 20-23, 2020), pp. 1324-1335, doi: 10.1109/PLANS46316.2020.9109935.

F. Dovis, R. Imam, W. Qin, C. Savas and H. Visser, "Opportunistic use of GNSS Signals to Characterize the Environment by Means of Machine Learning Based Processing," ICASSP 2020—2020 IEEE International Conference on Acoustics, Speech and Signal Processing (ICASSP) (May 4-8, 2020), pp. 9190-9194, doi: 10.1109/ICASSP40776.2020.9052924.

B. Guermah, H. E. Ghazi, T. Sadiki and H. Guermah, "A Robust GNSS LOS/Multipath Signal Classifier based on the Fusion of Information and Machine Learning for Intelligent Transportation Systems," 2018 IEEE International Conference on Technology Management, Operations and Decisions (ICTMOD) (Nov. 21-23, 2018), pp. 94-100, doi: 10.1109/ITMC.2018.8691272.

L.T. Hsu, "GNSS multipath detection using a machine learning approach," 2017 IEEE 20th International Conference on Intelligent Transportation Systems (ITSC) (Oct. 2017), pp. 1-6, doi: 10.1109/ITSC.2017.8317700.

Munin, Evgenii & Blais, Antoine & Couellan, Nicolas. Convolutional Neural Network for Multipath Detection in GNSS Receivers. arXiv:1911.02347v1 [eess.SP] (Nov. 6, 2019), pp. 1-10, https://doi.org/10.48550/arXiv.1911.02347.

M. Orabi, J. Khalife, A. A. Abdallah, Z. M. Kassas and S. S. Saab, "A Machine Learning Approach for GPS Code Phase Estimation in Multipath Environments," 2020 IEEE/ION Position, Location and Navigation Symposium (PLANS), (Apr. 20-23, 2020), pp. 1224-1229, doi: 10.1109/PLANS46316.2020.9110155.

Qin, Honglei & Xue, Xia & Yang, Qian. GNSS multipath estimation and mitigation based on particle filter. IET Radar, Sonar & Navigation, vol. 13, Issue 9 (Sep. 1, 2019), pp. 1588-1596. https://doi.org/10.1049/iet-rsn.2018.5587.

Quan Y, Lau L, Roberts GW, Meng X, Zhang C. Convolutional Neural Network Based Multipath Detection Method for Static and Kinematic GPS High Precision Positioning. Remote Sensing. (Dec. 17, 2018), 10(12):2052. https://doi.org/10.3390/rs10122052.

Savas, Caner, Dovis, Fabio, "Multipath Detection based on K-means Clustering," Proceedings of the 32nd International Technical Meeting of the Satellite Division of The Institute of Navigation (ION GNSS+ 2019), Miami, Florida (Sep. 16-20, 2019), pp. 3801-3811, https://doi.org/10.33012/2019.17028.

Suzuki, Taro, Nakano, Yusuke, Amano, Yoshiharu, "NLOS Multipath Detection by Using Machine Learning in Urban Environments," Proceedings of the 30th International Technical Meeting of the Satellite Division of The Institute of Navigation (ION GNSS+ 2017), Portland, Oregon (Sep. 2017), pp. 3958-3967. https://doi.org/10.33012/2017.15291.

Suzuki T, Amano Y. NLOS Multipath Classification of GNSS Signal Correlation Output Using Machine Learning. Sensors. (Apr. 3, 2021), 21(7):2503. https://doi.org/10.3390/s21072503.

Yozevitch, R., Moshe, B. B., and Weissman, A. A Robust GNSS LOS/NLOS Signal Classifier. J Inst Navig, 63:429-442. (May 2016) doi: 10.1002/navi.166.

Hoque, Mainul and Jakowski, N. "Estimate of higher order ionospheric errors in GNSS positioning", Radio Science, vol. 43, RS5008, doi:10.1029/2007RS003817, Oct. 9, 2008 (15 pages).

PCT International Search Report and Written Opinion from related PCT Application No. PCT/US2022/33617, mailed Sep. 12, 2022 (22 pages).

* cited by examiner

Figure 3

Final position: zPRR – weighted sum of grid positions

Figure 4A

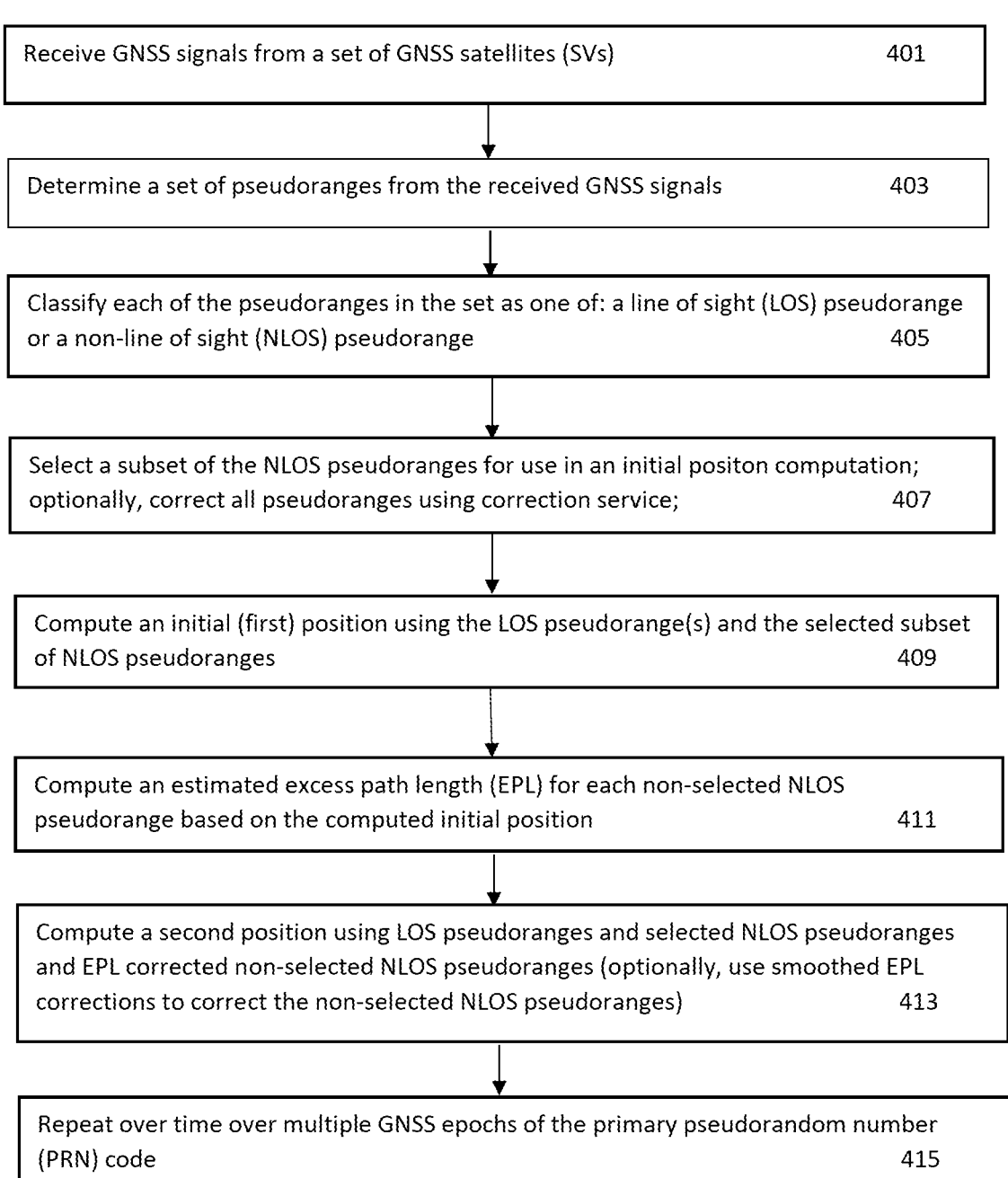

Receive GNSS signals from a set of GNSS satellites (SVs)        401

Determine a set of pseudoranges from the received GNSS signals        403

Classify each of the pseudoranges in the set as one of: a line of sight (LOS) pseudorange or a non-line of sight (NLOS) pseudorange        405

Select a subset of the NLOS pseudoranges for use in an initial positon computation; optionally, correct all pseudoranges using correction service;        407

Compute an initial (first) position using the LOS pseudorange(s) and the selected subset of NLOS pseudoranges        409

Compute an estimated excess path length (EPL) for each non-selected NLOS pseudorange based on the computed initial position        411

Compute a second position using LOS pseudoranges and selected NLOS pseudoranges and EPL corrected non-selected NLOS pseudoranges (optionally, use smoothed EPL corrections to correct the non-selected NLOS pseudoranges)        413

Repeat over time over multiple GNSS epochs of the primary pseudorandom number (PRN) code        415

Figure 4B

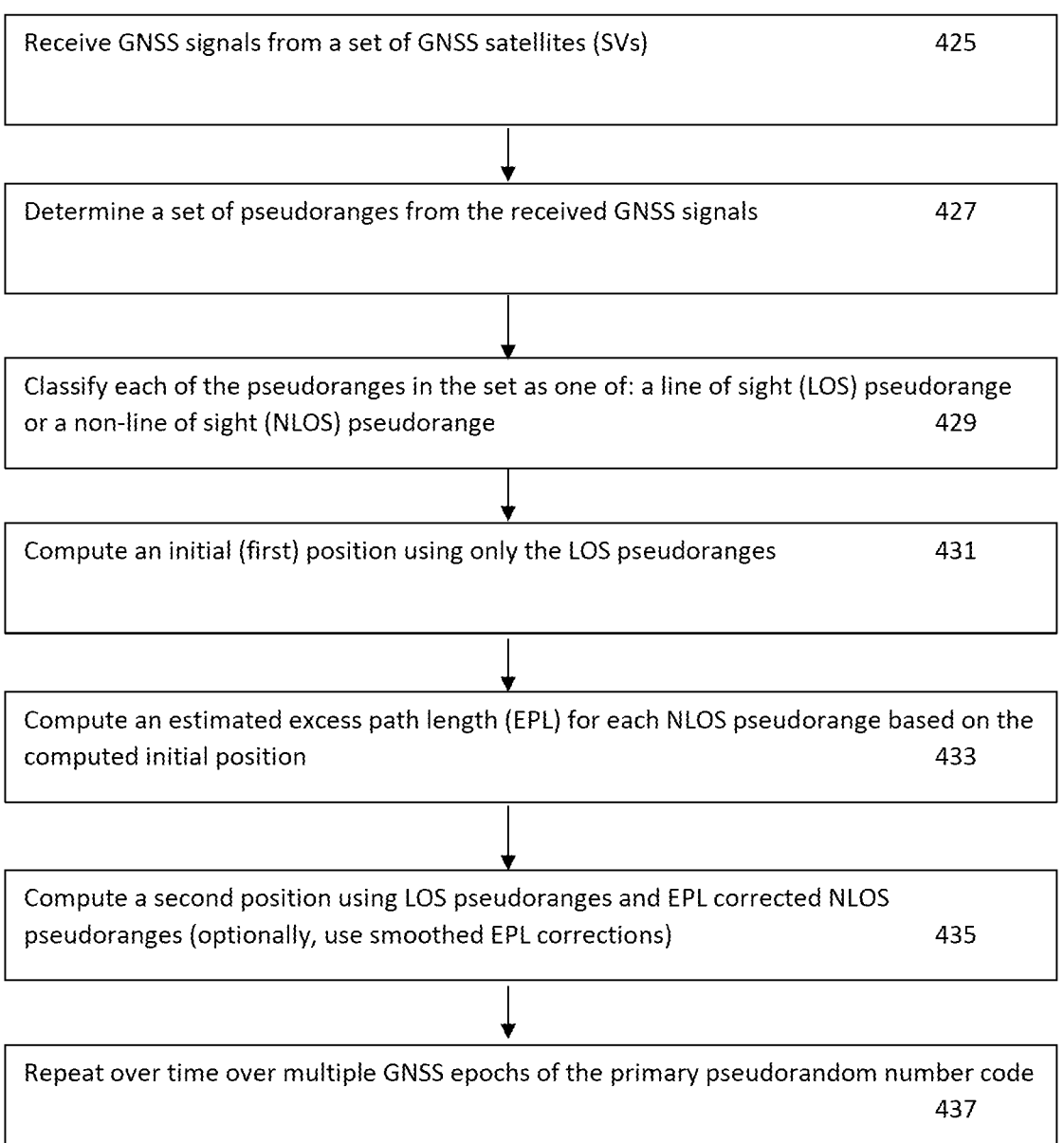

Receive GNSS signals from a set of GNSS satellites (SVs)     425

Determine a set of pseudoranges from the received GNSS signals     427

Classify each of the pseudoranges in the set as one of: a line of sight (LOS) pseudorange or a non-line of sight (NLOS) pseudorange     429

Compute an initial (first) position using only the LOS pseudoranges     431

Compute an estimated excess path length (EPL) for each NLOS pseudorange based on the computed initial position     433

Compute a second position using LOS pseudoranges and EPL corrected NLOS pseudoranges (optionally, use smoothed EPL corrections)     435

Repeat over time over multiple GNSS epochs of the primary pseudorandom number code     437

Figure 5A

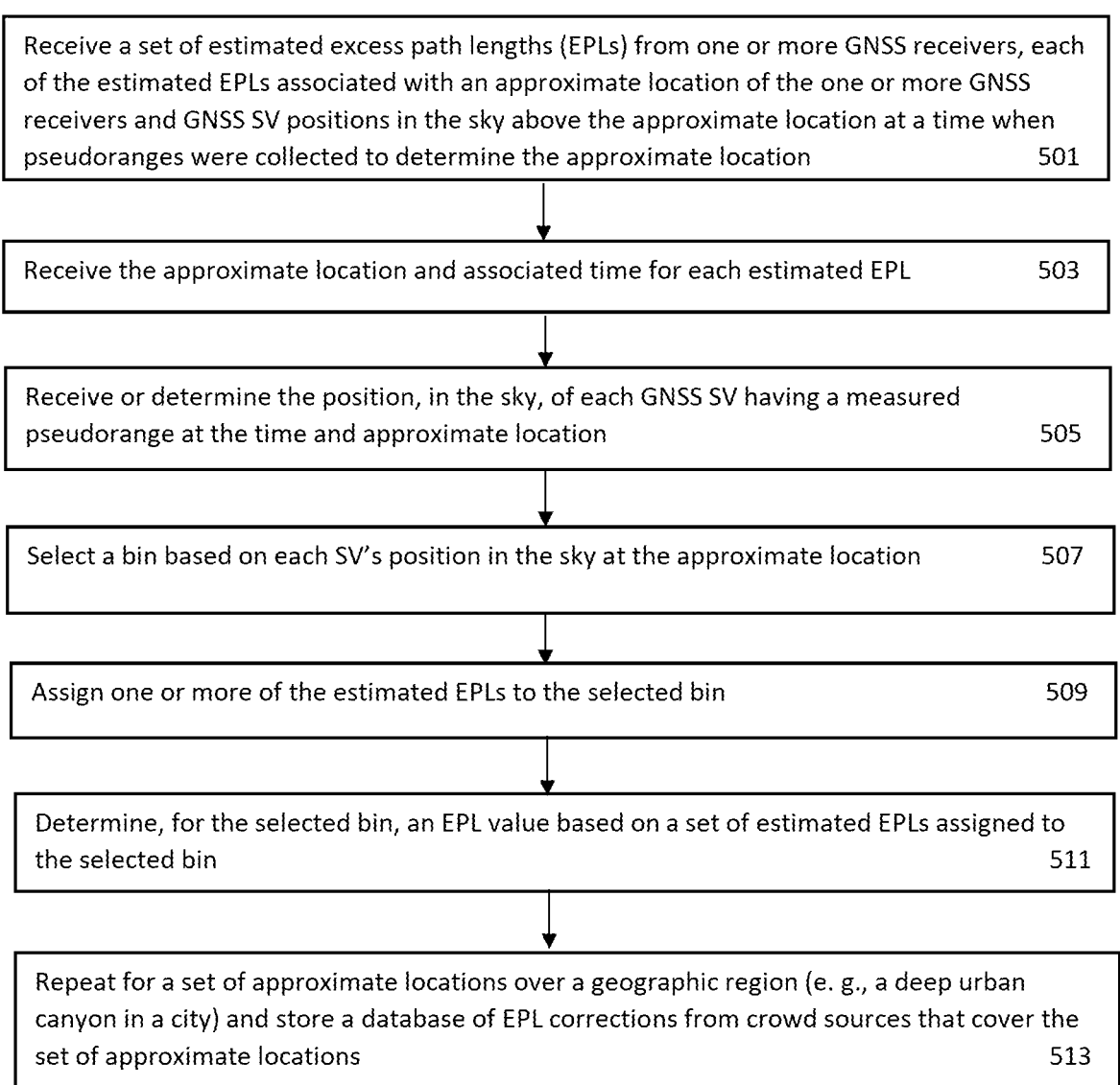

Receive a set of estimated excess path lengths (EPLs) from one or more GNSS receivers, each of the estimated EPLs associated with an approximate location of the one or more GNSS receivers and GNSS SV positions in the sky above the approximate location at a time when pseudoranges were collected to determine the approximate location                501

Receive the approximate location and associated time for each estimated EPL        503

Receive or determine the position, in the sky, of each GNSS SV having a measured pseudorange at the time and approximate location                505

Select a bin based on each SV's position in the sky at the approximate location        507

Assign one or more of the estimated EPLs to the selected bin                509

Determine, for the selected bin, an EPL value based on a set of estimated EPLs assigned to the selected bin                511

Repeat for a set of approximate locations over a geographic region (e. g., a deep urban canyon in a city) and store a database of EPL corrections from crowd sources that cover the set of approximate locations                513

METHODS AND SYSTEMS FOR EXCESS PATH LENGTH CORRECTIONS FOR GNSS RECEIVERS

CROSS-REFERENCE TO RELATED APPLICATIONS

This application claims the benefits of the following US provisional patent applications: application No. 63/415,245, filed Oct. 11, 2022 and application No. 63/365,710, filed Jun. 2, 2022, and both of these provisional patent applications were filed by applicant oneNav, Inc and are hereby incorporated herein by reference.

BACKGROUND

This disclosure relates to the field of systems that determine a position of a radio receiver, and in particular this disclosure relates to global navigation satellite system (GNSS) receivers, such as a GNSS receiver that can determine the position of the GNSS receiver from signals received from GNSS satellites (GNSS SVs).

Over the last few decades, the global navigation satellite systems have revolutionized our daily lives by providing the positioning and navigation services that play an important role in a variety of applications, spanning from transportation, agriculture, marine, and unmanned vehicles. As an example, the Uber Technologies, Inc., which is one of the pioneers in the smartphone-based transportation services and ride-hailing applications, is estimated to have over 93 million monthly active users worldwide.

GNSS receivers first reached the commercial domain in the early 1980s. By considerably rapid advancement in the technology, the GNSS receivers have been revolutionized through different generations. The first generation of truly mobile receivers were L1 C/A code only. The second generation started in approximately 2010, when the GLONASS GNSS system became modernized and reliable. The third generation of the GNSS receivers added support for the Galileo system launched by the European Union in 2011. The evolution to the fourth generation took some time as it added a new capability, i.e., to support for single sideband L5 receivers, where the Beidou constellation of SVs, the Galileo constellation of SVs, and the US GPS constellation of SVs all have modernized signals.

It is known that multipath effects on GNSS signals can cause large errors in position calculations in GNSS receivers. Multipath effects often occur in urban canyons where the same transmitted signal from a GNSS SV is reflected multiple times off surfaces of the buildings surrounding a street where a GNSS is located; diffraction effects can also occur causing a significantly polluted signal at the receiver. For example, the GNSS receiver in this case can receive both a line of sight (LOS) signal and multiple non-line of sight (NLOS) signals from the same SV. This can distort the pseudorange measurements made in the GNSS receiver, often to the point that the GNSS receiver measures a pseudorange that has significant error, resulting in a position solution that can be in error by more than 100 meters (100 m). This inaccuracy can result in situations in which a driver of a taxi service (e.g., Uber) is directed to the wrong side of the street by the GNSS receiver of the potential passenger who is waiting for the taxi service. This problem has been studied in the GNSS field, and many solutions have been proposed.

One solution uses a classifier to classify signals as either LOS or NLOS; in this solution, the goal is to ignore or reject the NLOS signal and use only the LOS signal, if available, in the pseudorange measurement. This solution has been achieved with different approaches, including the use of machine learning (e.g., a neural network used to classify the signals). If the LOS signal is not available, then the signal is ignored (so no pseudorange measurement of the signal is provided as an output from the GNSS receiver). Another solution is described in U.S. Pat. No. 9,562,770 (inventor: Lionel J. Garin); in this approach, a signal visibility database, that contains information about the size (e.g., height, width and length) of signal obstacles (e.g., buildings in an urban canyon), is used to determine expected line of sight signals and expected NLOS signals at locations along a pathway (e.g., street in the urban canyon). This approach can use ray tracing algorithms with a 3D building map and the exact location of the SVs (at any given time) to provide location information without attempting to measure pseudoranges at the GNSS receiver.

SUMMARY OF THE DESCRIPTION

The methods and systems described herein can provide EPL corrections that can correct pseudorange measurements in a GNSS receiver, and these corrected pseudorange measurements can then be used in a position solution algorithm to produce a position of the GNSS receiver.

In one embodiment, a method of operating a GNSS receiver can include the following operations: receiving GNSS signals from a set of GNSS satellites (SVs); determining a set of pseudoranges from the received GNSS signals; classifying each of the pseudoranges in the set of pseudoranges as one of a line of sight (LOS) pseudorange or a non-line of sight (NLOS) pseudorange; computing an initial position of the GNSS receiver using one of: (a) only pseudoranges classified as a LOS pseudorange or (b) pseudoranges classified as LOS pseudoranges and a selected subset of pseudoranges classified as NLOS pseudoranges; and computing, for each non selected NLOS pseudorange relative to the initial position, an estimated excess path length (EPL), which may be represented by a computed residual. In one embodiment, the method can further include the operations of: selecting the selected subset based on a set of probability data derived by the classifying; the selecting of the selected subset also defines a set of non-selected NLOS pseudoranges; and computing an uncertainty of each estimated EPL for the set of non-selected NLOS pseudoranges. The method can further include the operation of computing a final position of the GNSS receiver after computing the initial position; the uncertainty can be computed by projecting a line of sight to a GNSS SV from which the NLOS pseudorange was obtained. In one embodiment, each computed residual (which represents an EPL correction) for each non-selected NLOS pseudorange can be adjusted by a clock error estimation derived from the computed initial position. In one embodiment, the method can further include the operation of: smoothing and predicting in the future each estimated EPL with a prediction method (e.g., with a per SV Kalman filter); each estimated EPL can be computed by computing a difference between a measured non-selected NLOS pseudorange and an estimated true range, the estimated true range being the distance between an SV that transmitted signals used to measure the non-selected NLOS pseudorange and the initial position. In one embodiment, the method can further include the operation of: detecting a change in estimated EPL for an SV that exceeds a threshold and resetting the prediction method (e.g., resetting the Kalman filter) for that SV in response to the detected change. Each Kalman filter is dedicated to a particular GNSS SV to filter the estimated EPL for pseudoranges for that particular GNSS SV (in the non-selected subset), and the filtered EPL corrections can be used to correct subsequent non-selected pseudoranges for that SV. In one embodiment, the method can further include the operation of: transmitting, from a system containing the GNSS receiver, each smoothed EPL and each smoothed EPL uncertainty (for each non-selected pseudorange) and the final position and a time associated with the final position (e.g., a time associated with a GNSS epoch that was used to derive the non-selected pseudorange); the method may also include transmitting an SV elevation and SV azimuth for each SV from which NLOS pseudoranges were derived. The transmission, to a cloud based assistance service, of these EPL corrections (e.g., the smoothed EPL corrections and other data as described herein) can enable the cloud based assistance service to create a cloud based EPL correction database as described further below. A system that can perform this method is also described herein, and that system may, for example, be a smartphone or wearable device (e.g., a smart watch or head mounted display, etc.) or an Internet of Things (IOT) device or a mobile vehicle (e.g., an automobile) or other devices which can include a GNSS receiver.

In one embodiment, a method of operating a GNSS system, which includes a cloud based assistance service, can include the following operations to create an EPL correction database: receiving a set of estimated excess path lengths (EPLs) from one or more GNSS receivers, each of the estimated EPLs associated with an approximate location of the one or more GNSS receivers and a GNSS satellite's (SV's) position in a representation of sky above the approximate location at the approximate location at a time when pseudoranges were collected to determine the approximate location; receiving the approximate location for each estimated EPL; receiving or determining the GNSS SV's position in the representation of sky at the time and the approximate location; selecting a bin (in the EPL correction database) based on the SV's position in the representation and the approximate location; assigning one or more of the estimated EPLs to the selected bin; and determining, for the selected bin, an adjusted EPL value based on a set of estimated EPLs assigned to the selected bin (e.g., a weighted sum of the set of estimated EPLs assigned to the selected bin, where the weight can be based on received EPL uncertainty values for the set of estimated EPLs assigned to the selected bin). The cloud based system can store the adjusted EPL values for each bin in the EPL correction database for use by GNSS systems that include GNSS receivers that request EPL corrections from the cloud based assistance service. The adjusted EPL correction values stored in the EPL correction database can be considered EPL corrections from a crowd based source (e.g., the one or more GNSS receivers that transmitted the set of estimated EPLs to the cloud based system), and this method of creating the EPL correction database does not require the use of 3D building maps and ray tracing algorithms used with those 3D maps. In one embodiment, each bin can be considered a partition or portion in the EPL correction database that stores the EPL correction or set of EPL corrections for a given approximate location and GNSS SV's position in the representation of the sky (e.g., the elevation and azimuth of a GNSS SV); each bin corresponds to a portion of the sky (e.g., a 1 degree by 1 degree portion of the sky). Collectively, a set of bins can be considered to cover all or most of the sky above a set of possible positions for which EPL corrections can be provided to GNSS receivers. The position of a GNSS SV in the representation of the sky can be specified in a coordinate system that is one of: (a) azimuth and elevation; (b) a cartesian coordinate system; (c) a polar coordinate system; (d) a spherical coordinate system; or other coordinate systems that specify position in the sky relative to the approximate location. In one embodiment, the position of each GNSS SV in the representation in the sky can be computed by the cloud based assistance service from known GNSS SV ephemeris data and information from a GNSS receiver such as an approximate location and a GNSS time associated with the approximate location (e.g., a time of a GNSS epoch associated with pseudorange measurements used to derive the approximate location of the GNSS receiver); alternatively, each GNSS receiver may provide this position data for each SV along with any corresponding estimated EPL corrections. Once an EPL correction database has been created, it can be used to provide EPL corrections, from the EPL correction database, to GNSS receivers that request such corrections for a given location and time (provided by the requesting GNSS receiver). In one embodiment, a set of one or more transmission servers can receive such requests from GNSS receivers and respond to such requests by providing the appropriate EPL corrections for each received approximate location and time associated with the approximate location.

In one embodiment, a method of operating a GNSS receiver that uses an EPL correction database can include the following operations: receiving, at the GNSS receiver, GNSS signals from a set of GNSS SVs; determining a set of pseudoranges from the received GNSS signals; and receiving, from a cloud based system, a set of one or more EPL corrections for one or more NLOS pseudoranges, each EPL correction in the set of one or more EPL corrections selected from a bin assigned to a combination of an approximate location of the GNSS receiver and a position of a GNSS SV in a representation of sky above the approximate location, and each EPL correction in the set of one or more EPL corrections is derived from crowd sourced EPL corrections. In one embodiment, the method can further include the operations of: classifying each of the pseudoranges in the set of pseudoranges as one of LOS pseudorange or NLOS pseudorange; computing a first position (which is an approximate location) of the GNSS receiver using the pseudoranges classified as LOS pseudoranges and a selected subset of NLOS pseudoranges; transmitting the first position and a time representing when the GNSS signals (used to derive the first position) were received; and computing a second position based on the one or more EPL corrections received from the EPL correction database containing the crowd sourced EPL corrections. In one embodiment, the set of pseudoranges can be determined from a set of correlation vectors (CorrVecs), and conventional differential and ionosphere corrections may be applied to the pseudoranges in the set of pseudoranges. A system that can perform this method is also described herein, and that system may, for example, be a smartphone or wearable device (e.g., a smart watch or head mounted display, etc.) or an Internet of Things (IOT) device or a mobile vehicle (e.g., an automobile) or other devices which can include a GNSS receiver.

The aspects and embodiments described herein can include non-transitory machine readable media that can store executable computer program instructions that when executed cause one or more data processing systems (e.g., one or more GNSS processing systems in a GNSS receiver) to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems, such as GNSS receivers or portions of GNSS receivers, that are built or programmed to perform these methods. For example, a data processing system can be built with hardware logic to perform these methods or can be programmed with a computer program to perform these methods and such a data processing system can be considered a part of a GNSS processing system or part of a GNSS receiver. Further, the embodiments described herein can use one or more GNSS receiver architectures (or components, methods or portions of such architectures) described in U.S. patent application Ser. No. 17/068,659, filed Oct. 12, 2020 by Paul Conflitti, et. al., with oneNav, Inc. as the Applicant and this patent application is hereby incorporated herein by reference, and this patent application was published on May 5, 2022 under publication number US 2022/0137236.

The above summary does not include an exhaustive list of all embodiments and aspects in this disclosure. All receivers, systems, media, and methods can be practiced from all suitable combinations of the various aspects and embodiments summarized above and also those disclosed in the detailed description below.

BRIEF DESCRIPTION OF THE DRAWINGS

The embodiments in this disclosure are illustrated by way of example, and not limitation, in the figures of the accompanying drawings in which like references indicate similar elements.

FIG. 3 is a block diagram of a system that uses an EPL correction database.

FIG. 4A is a flowchart that shows a method according to one embodiment for generating EPL corrections.

FIG. 4B is a flowchart that shows a method according to another embodiment for generating EPL corrections.

FIG. 5A is a flowchart that shows a method according to one embodiment for creating an EPL corrections database that may be hosted in a cloud based system.

DETAILED DESCRIPTION

Figure 1A:
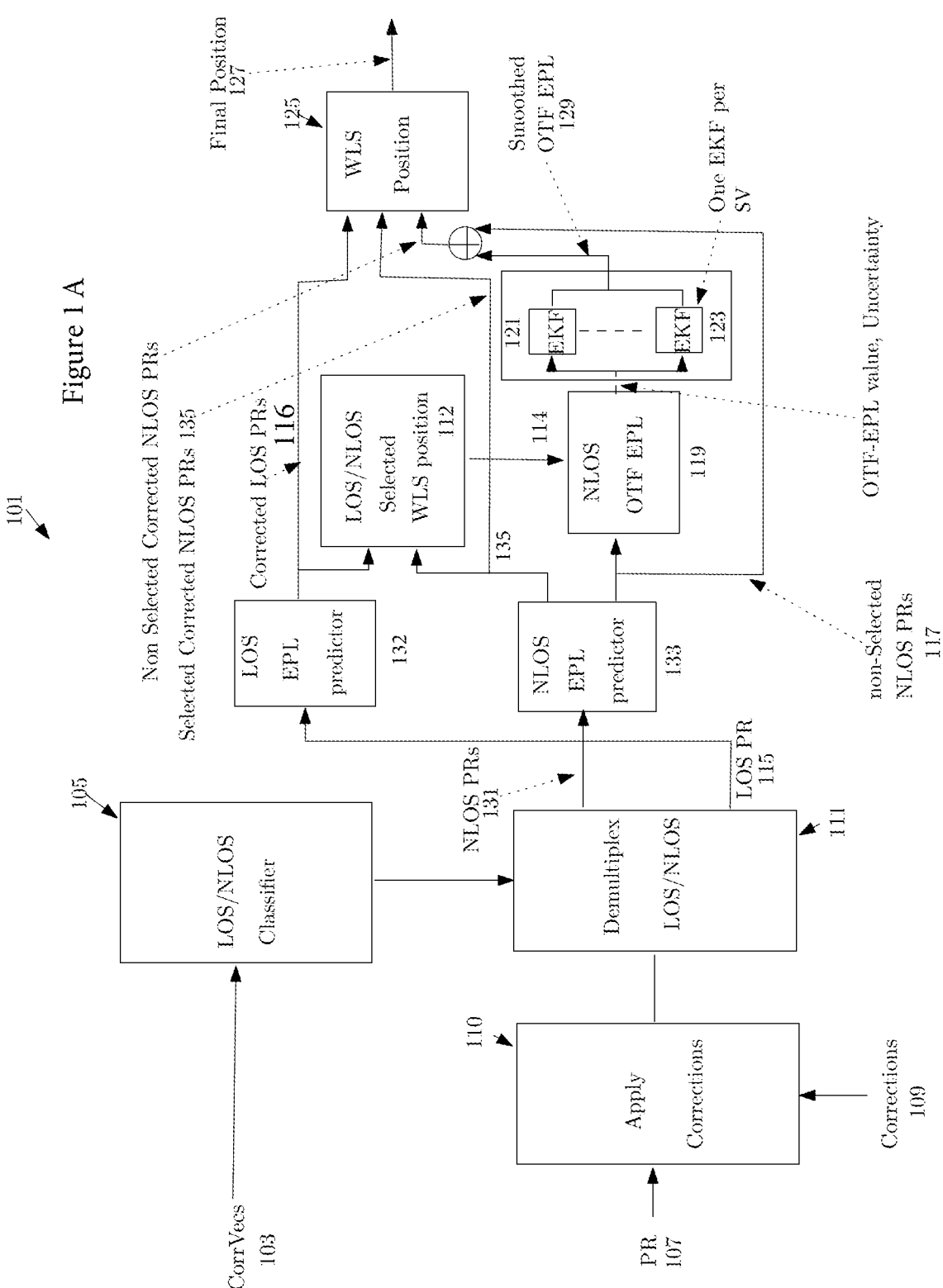
FIG. 1A is block diagram of a system that can generate EPL corrections.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Introduction

This disclosure relates to methods and systems for processing Global Navigation Satellite System (GNSS) signals, such as a GNSS receiver that can determine the position of the GNSS receiver from GNSS signals received from GNSS satellites (SVs) such as SVs in one or more constellations of GNSS SVs such as the US GPS constellation, the Galileo constellation, and the Beidou constellation. Certain environments that create multipath effects around a GNSS receiver can cause large errors in the position solutions produced by a GNSS receiver. For example, urban canyons typically produce large multipath effects that distort pseudorange and Doppler measurements made by a GNSS receiver. The Extra Path Length [or excess path length] (EPL) is a measure of Pseudo-Range (PR) correction needed to compensate for the MultiPath (MP) effects in urban environments. If there is no measurable energy at a Line-of-Sight (LOS) distance, there is no obvious direct way to estimate the EPL by only observation of the signal attributes.

This disclosure is an alternate way to estimate the EPL and correct the Pseudo ranges before computing a position without any direct knowledge of the environment (such as 3D building maps in the vicinity of the environment) or the Non-Line-Of-Sight (NLOS) conditions.

This EPL estimation can be either used in "pseudo" real time for real-time compensation of MP, and improvement of the position accuracy, or used for populating and improving a database of EPL corrections attached to geographic grid points (e.g., grid points in streets and pedestrian walkways of urban canyons), that can be used for improving the immediate PR correction, either for a dedicated or a conventional architecture (only PR available). A GNSS receiver that uses the methods described herein can have any one of the various hardware architectures of GNSS receivers that are known in the art. For example, any one of the GNSS receivers described in published US patent applications 20220137236 and 20210373179 can be used to perform the methods described herein, and both of these published applications are hereby incorporated herein by reference.

General Method Based on Weighted Least Squares (WLS)

A method, in one embodiment, is to compute a first position using the most reliable measurements, such as pseudorange measurements. guaranteed or classified to be LOS; see U.S. provisional patent application No. 63/365,710, filed on Jun. 2, 2022 by Applicant oneNav, Inc for a description of this method. The classification of PR in LOS and NLOS can be done by one of the several prediction methods found in the literature (e.g., see references [1] or [2] in the references section below, or see U.S. provisional patent application No. 63/243,028, filed on Sep. 10, 2021 by Applicant oneNav, Inc., which US provisional patent application is hereby incorporated herein by reference and U.S. non-provisional patent application Ser. No. 17/836,116, filed on Jun. 9, 2022 by Applicant oneNav, Inc which US non-provisional patent application is hereby incorporated herein by reference). An alternative method, described as an embodiment in this disclosure, is to also use selected NLOS measurements that have reliable EPL estimations which can be obtained from machine learning predictions (such as the machine learning predictions described in U.S. patent application Ser. No. 17/836,116, filed on Jun. 9, 2022). This alternative method relaxes the requirement of using only LOS measurements by combining LOS measurements with selected NLOS measurements. This alternative method is more robust in urban canyons where it may be difficult to obtain four LOS measurements; for example, it may be possible to receive and compute three LOS pseudorange measurements in an urban canyon but at least one NLOS pseudorange measurement may have a high enough reliability (e.g., a classifier ranks it as nearly LOS based on a probability value) that it can be used in combination with the three LOS measurements.

One of the methods to assess the quality of positions derived from this alternative method is to look at the residuals from the combination of LOS and the selected NLOS pseudoranges and compare their normalized sum squared to a maximum threshold.

The estimated EPL's are obtained by computing the post-fix (post position solution) residuals (e.g., residuals computed from values computed as a result of a WLS algorithm) for each NLOS SV vs. the LOS and selected NLOS-derived position and correcting for the clock error issued from the LOS/selected NLOS position computation.

As these estimates are NOT true EPL (they are referenced against the approximate position, not the unknown true position), an embodiment can estimate the position uncertainty in the direction of the satellite and assign it as the estimated EPL uncertainty. These estimated EPLs are also impacted by the accuracy of the clock estimate. An embodiment can compute an uncertainty (e.g., standard deviation) by projecting the theoretical LOS vector from the center of the 3D uncertainty ellipsoid and adding a measurement of clock error (e.g., standard deviation of the clock error) from the LOS position computation. Of course, these errors are additive, and the sum can be done in the variance domain, then reduced to the standard deviation domain by a square root operation (see APPENDIX 1, Variance of $$\mathcal{M}_{rov,j}^{s}).$$

These estimated EPL's for non-selected NLOS PRs cannot be used by directly correcting the PR and adding them as extra measurements to the LOS/non-selected NLOS position computation. There is NO extra information per epoch as they are a by-product of the result of the WLS for the initial position computation that was derived from the LOS and selected NLOS pseudoranges. Combining them as extra inputs will not change the LOS position. An embodiment exploits the relative stability of the EPL (at least by segments) to estimate the EPL and variation over time over several past position fixes, and to inject this filtered estimate into the weighted least squares (WLS) final computation (for subsequent GNSS epochs after the epoch from which the initial LOS/selected NLOS position was computed).

In a more detailed way, an algorithm to be applied at each measurement epoch in one embodiment is as follows:
1. Collect PR for all tracked satellites.
2. Correct all measurements with conventional differential correction (e.g., conventional corrections for ionosphere error, troposphere error, SV clock error, SV position error) either using a dedicated local base station or a correction service.
3. Classify measured PRs into LOS and Non-LOS categories using a proper classifier; this classifier can use correlation vectors (CorrVecs) derived from each SV's GNSS signals. A correlation vector can be a vector containing the outputs of correlators in a bank of correlators or correlation operations for each measured epoch (e.g., if the GNSS receiver has 21 correlator outputs for each measured epoch for a particular SV's pseudorandom number code, each correlation vector has 21 values containing the result of each correlator). The classifier can use algorithms known in the art to classify each measure PR; see, for example, references [1] and [2] in the references section below.
4. Assess the reliability or quality of the LOS and NLOS measurements (on a per SV basis) and select a subset (minimum of 4) of LOS measurements (with an assumed EPL=0) and selected NLOS measurements (with an assigned EPL correction that has a high reliability).
5. Compute an initial position using all the LOS PRs and selected NLOS PRs with EPL corrections applied to the selected NLOS PR's. The combination of LOS and selected NLOS still requires a combination of 4 LOS and selected NLOS satellites minimum (but we explain later how this limitation can be overcome with EKF in place of the WLS). The result can be very inaccurate (high DOP), and this uncertainty will be reflected in the error associated with the EPL estimation.
6. Compute the post-fix residual (e.g., a residual computed after an initial position solution using a WLS algorithm) of each PR not used in the initial position solution computation against the initial position, MINUS the clock error estimation derived from the LOS position computation. This is an estimate of the EPL, referenced to the approximate position obtained from the initial position solution (that used only LOS PRs and a selected subset of NLOS PRs).
7. Compute an uncertainty of this EPL estimate by projecting the line of sight of the satellite in the 3D ellipsoid of LOS/selected NLOS position uncertainty, and square adding the clock error (e.g., standard deviation) derived from the WLS computation (see APPENDIX 1).

Because it was derived from the positioning algorithm, the EPL estimation cannot be directly used back in the position algorithm on a per epoch basis. Therefore, we refer to it as a "Pseudo Real Time" method. The EPL estimation for each NLOS PR can however be used in subsequent epochs based on the theory that the EPL for a given NLOS PR is likely to be stable over a short period of time.

The time sequence of the EPL per satellite has seconds of very consistent values, constant, or smooth variations interrupted by important sudden disruptions due to change of reflecting surfaces (example, at the edge of a building). These sudden disruptions can be handled, as explained herein, by resetting the per SV Kalman filter used to smooth EPL estimates.

In one embodiment, a GNSS processing system estimates the EPL per satellite, by injecting per epoch EPL estimation and associated variance into a simple three state (estimated EPL value, derivative [change of EPL over time], and jerk) Extended Kalman Filter (EKF). By the constantly changing set of tracked satellites, and the very fickle nature of EPL, the best implementation is a dynamic array keeping the current state of each tracked SV's Kalman filter (KF) and being updated per epoch.

Due to the sudden disruptions of the behavior of GNSS signals in an urban canyon, a reliable detection of change in condition can be used to reset the per satellite individual EKF filter when a disruption is detected (e.g., a change in EPL over time exceeds a threshold value). The current filtered value of the EPL estimate will be injected, along with its WLS algorithm estimated variance.

The output of each KF smoothed estimated EPL is then used to correct the corresponding non-selected NLOS PR's, along with their variance. The LOS/selected NLOS combination of measurements used in a final WLS computation is then enhanced by using these extra measurements from the non-selected NLOS PRs in the final WLS computation.

If the loop tracking point or estimation is incorrect (false lock on a metastable point or one of the multiple unwanted stable points on the delay lock loop S curve,) the on-the-fly (OTF) EPL estimation will compensate for this, provided the false tracking point is stable for a while (several seconds). In very perturbated multipath (MP) environments, these "meta" tracking points are sometimes observed, and difficult to detect and correct. So far, the chance to observe them on LOS measurements is quite low. The on-the-fly EPL estimation is obtained by computing an approximate position from the LOS/selected NLOS measurements (not affected by these false tracking points) and will compensate for of the potential incorrect tracking points for the NLOS measurements, delivering an overall protection against these false tracking points. Protection for false tracking points will not be available for the selected NLOS measurements.

FIG. 1A shows an example of an embodiment and a method that can generate OTF EPL corrections. The method can be performed by an appropriately designed GNSS receiver (e.g., the GNSS receiver shown in FIG. 7A) that can generate correlation vectors (CorrVecs) from received GNSS signals. Embodiments of GNSS receivers that can generate correlation vectors are described in the literature; for example, in one embodiment, a bank of correlators (or bank of correlation operations) can generate, for a received GNSS signal having a pseudorandom number (PRN) code, a correlation vector ("CorrVec") that represents the outputs from the bank of correlators. Each correlator (in the bank of correlators) is comparing a particular delayed version of its local replica of the PRN code for the GNSS signal with the received GNSS signal. In one embodiment in which there are 21 correlators in the bank of correlators in the GNSS receiver, each correlation vector can be a 21 by 1 vector. A GNSS system 101 can be part of a GNSS receiver which may be included in a smartphone, wearable (e.g., watch) or other device. The GNSS system 101 in FIG. 1 can receive GNSS signals and compute pseudoranges 107 (PR 107) and correlation vectors 103 (CorrVecs 103). The GNSS system can include a LOS/NLOS classifier 105 that can classify a computed pseudorange as either LOS or NLOS; such classifiers are known in the art and may be implemented with trained neural networks or other approaches. The classifier can generate a ranked list of PRs, where the ranking is based on a computed probability that a PR is a LOS measured PR; in one embodiment, the higher the probability, the more likely that the measured PR is a LOS measured PR. In one embodiment, a first threshold value (e.g., 90% probability) can be used to classify the measured PRs; any measured PR having a probability of being a LOS PR that exceeds the first threshold can be classified as a LOS PR and any measured PR having a probability that is less than the first threshold can be classified as a NLOS PR. Further, the classifier 105 can be used to select reliable NLOS PRs using a second threshold value which is less than the first threshold value (e.g., second threshold value is % probability); in one embodiment, NLOS PRs having probabilities between the first and second threshold can be selected, corrected and used in an initial position solution (e.g., in GNSS processing logic 112 which is a GNSS position engine that uses a WLS algorithm in one embodiment) as described below. NLOS PRs 135 in FIG. 1 are considered reliable NLOS PRs that have been selected and corrected as described herein. GNSS processing logic 110 can apply conventional corrections 109 (e.g., ionospheric corrections, SV clock error corrections, etc.) to the pseudoranges 107, and these corrected pseudoranges are passed through selector 111 (which is similar to a demultiplexer) based upon data from classifier 105 so that corrected LOS pseudoranges 115 are provided to LOS EPL predictor 132 and corrected NLOS pseudoranges 131 are provided to EPL predictor 133. The EPL predictor 133 can generate EPL corrections for the NLOS PRs 131 using a trained machine learning system (such as the trained neural network described in U.S. patent application Ser. No. 17/836,116 which was filed on Jun. 9, 2022 by Applicant oneNav). In one embodiment, the EPL predictor 133 generates EPL corrections for each NLOS PRs in the set of all NLOS PRs 131 (which include both selected NLOS PRs 135 and non-selected NLOS PRs 117). The EPL predictor 132 can generate EPL corrections for each LOS PR 115 also using such a trained machine learning system. The selected and corrected NLOS PRs 135 are provided to the GNSS processing logic 112 which also receives the corrected LOS PRs 116 (that are corrected by both conventional corrections 109 and EPL corrections from LOS EPL predictor 132); these NLOS PRs 135 represent the reliable NLOS PRs that will be used in combination with the corrected LOS PRs 116 by the GNSS processing logic 112 to compute an initial position by using, for example, a WLS algorithm in a GNSS position engine implemented by the GNSS processing logic 112. The selected NLOS PRs 135 are corrected by both conventional corrections 109 and EPL corrections from the EPL predictor 133. The non-selected NLOS PRs 117 can be corrected with EPL corrections produced by EPL predictor 133, but these NLOS PRs will not be used in the WLS position computation algorithm implemented in GNSS processing logic 112, and the EPL predictions for the non-selected NLOS PRs will also not be used in one embodiment (but rather a computed EPL for each non-selected NLOS PR will be used as described further below).

As shown in FIG. 1A, the corrected LOS pseudoranges 116 and the selected and corrected NLOS PRs 135 are provided to GNSS processing logic 112 that uses a WLS position algorithm to compute an initial position 114 based upon the corrected LOS pseudoranges and the selected and corrected NLOS PRs 135. The GNSS processing logic 112 computes an approximate or initial position and clock bias 114 using a WLS algorithm based on the LOS pseudoranges 116 and the selected and EPL corrected NLOS PRs 135, and this approximate position is the approximate or initial position and clock bias 114 which is provided as an input to the NLOS OTF processing logic 119. The NLOS OTF processing logic 119 receives the non-selected NLOS PRs 117 and is configured in one embodiment to compute the post position residual of each non-selected NLOS pseudorange (in the set of non-selected NLOS PRs 117) against the time-propagated final position 127 and can use the approach in Appendix 1 to compute these residuals which represent the EPL corrections for the non-selected NLOS pseudoranges; these residuals can be corrected with the clock error estimation derived from the LOS position computation (e.g., the WLS algorithm used by processing logic 125). In one embodiment, the NLOS OTF processing logic 119 uses initial position and clock bias 114 (and SV ephemeris data for each non-selected NLOS PR) to compute an estimate of the true range to each non-selected SV associated with its respective non-selected NLOS PR; the difference between this estimated true range and the measured non-selected NLOS PR can be used as the computed EPL for the non-selected NLOS PR for the particular non-selected SV. The SV ephemeris data provides the position of the SV and the initial position and clock bias 114 provides the position of the GNSS receiver so that the estimate of the true range (between the GNSS receiver and the SV) can be computed. The NLOS OTF processing logic 119 can also compute the uncertainty of each EPL estimate for each non-selected NLOS pseudorange. The NLOS OTF processing logic 119 provides, for each non-selected NLOS pseudorange for an SV, an EPL correction value and an EPL uncertainty as an input to a per SV extended Kalman filter for that SV, such as extended Kalman filters (EKFs) 121 (for SV1 that has a non-selected NLOS PR in the set of NLOS PRs 117) and 123 (for SVn that has a non-selected NLOS PR in the set of NLOS PRs 117). In other words, each non-selected SV that is associated with the set of non-selected NLOS PRs 117 has its own extended Kalman filter. The NLOS OTF processing logic 119 can implement each of these per SV EKFs that generate smoothed EPLs 129 after several GNSS epochs of processing of the EPLs for each SV that has a non-selected NLOS PR. These EKFs in processing logic 119 can produce smoothed OTF EPL values for each SV having a pseudorange classified as a non-selected NLOS pseudorange. These smoothed OTF EPL values 129 can be used in the pseudo real time approach to correct non-selected NLOS pseudoranges in future GNSS epochs as described herein. The GNSS processing logic 125 is a GNSS position engine that receives, as inputs, the corrected LOS PRs 116, the selected and corrected NLOS PRs 135, SV ephemeris data, the non-selected NLOS PRs 117, and the smoothed EPLs 129 for the non-selected NLOS PRs 117, and the GNSS processing logic 125 computes a final position 127 using, in one embodiment, a WLS algorithm. Thus, final position 127 in those future GNSS epochs can benefit from the EPL corrections of the non-selected NLOS pseudoranges and can use the entire set of PRs, including the corrected LOS PRs 116, the selected and corrected NLOS PRs 135, the non-selected NLOS PRs 117, and the smoothed EPLs 129 from the non-selected NLOS PRs 117, in the WLS algorithm implemented by GNSS processing logic 125. As noted herein, the GNSS processing system can detect a sudden change in EPL (e.g., a derivative of the EPL over time for a non-selected NLOS PR exceeds a threshold value) for a particular SV, and in response to this sudden change, the GNSS processing system can reset the extended Kalman filter for that particular SV. In one embodiment, the EKF can have, as a process noise input, a code minus carrier residual as an indicator of the degree to which an EPL state has changed since the last update. The code minus carrier residual can be the new raw PR minus the predicted previous PR propagated forward with the carrier frequency according to the scaling between carrier doppler and code doppler. When the EPL is not changing (e.g. below a threshold value), the code minus carrier residual (CMCR) will be small and mainly thermal noise. When the EPL has a large change since the previous measurement, it indicates that the EPL has changed, such as moving from LOS to NLOS, or NLOS to LOS, or from one NLOS to another NLOS. This would indicate the EKF process noise needs to be increased to allow estimating a new state for the EPL. The CMRC (code minus carrier residual) can be computed with a carrier Doppler associated with the tracking point of the NLOS PR. This is the correct Doppler for an NLOS signal as it describes the rate at which the NLOS PR is changing as the GNSS receiver moves. Such a residual can be ideal as a propagator of the estimated EPL. For example, if an SV is selected to participate in block 112, then it will not be updated in the current epoch. The CMRC in the current epoch allows the EPL to be propagated in the current epoch to be used in GNSS processing logic 125. Other solutions than KF can be implemented in the prediction of future EPL values per satellite. An alternative method could be a particle filter, that can be considered as an extension of the KF. Simple time extrapolation schemes such as polynomial fits, or splines could advantageously replace the standard KF, with a lower computing load. Also, neural networks could be implemented with the same objective.

FIG. 4A shows an example of a method that can be used by the system 101 shown in FIG. 1A. The system 101 can receive GNSS signals from a set of GNSS satellites (SVs) in operation 401 and can then determine a set of pseudoranges from the received GNSS signals in operation 403. Then, in operation 405, the system 101 can classify (e.g., in classifier 105) each of the determined pseudoranges in the set of pseudoranges as one of a LOS pseudorange or a NLOS pseudorange. Then the system 101 can, in operation 407, select a subset of the NLOS pseudoranges to be used to compute an initial position 114 (in FIG. 1A). Then in operation 409, the system 101 can compute the initial position using the classified LOS pseudoranges and the selected subset of NLOS pseudoranges. This initial position can then be used in operation 411 to compute an estimated EPL for each non-selected NLOS pseudorange. The system 101 can then compute a second position (or final position) in operation 413 by using, in a GNSS epoch, the EPL corrected non-selected NLOS pseudoranges along with LOS pseudoranges and selected NLOS pseudoranges as described herein. In one embodiment, the EPL corrections for the non-selected NLOS pseudoranges can be smoothed over multiple GNSS epochs in extended Kalman filters as described above, and these smoothed EPL corrections are used to correct the non-selected NLOS pseudoranges. The final position is computed at the same (current) GNSS epoch as the initial position. The initial position is used to compute a current estimate of the EPL, and this current estimate of the EPL is used to update the appropriate SV's extended Kalman filter to get a smoothed current estimate of the EPL for the SV's pseudorange. The smoothed current estimate of the EPL is used to correct the NLOS PR for the SV in the current epoch. The final position is computed for the same current GNSS epoch, using all corrected measurements already used in the initial position plus the extra non-selected and corrected NLOS PRs. This method can be repeated (as shown in operation 415) over time over multiple GNSS epochs of the primary PRN code of each received GNSS signal. Thus, processing after operation 413 can repeat by reverting back to operation 401 in FIG. 4A; this continued processing over time can improve the smoothed EPL corrections generated by the extended Kalman filters. This can produce more precise smoothed EPL corrections and also allow the GNSS receiver to use more non-selected NLOS PRs (after correcting for EPLs) in the current final position solution. In addition, the method may include the use of conventional corrections of the pseudoranges and clock corrections as described relative to FIG. 1A. In addition, the method may include transmitting the estimated EPLs and associated data (e.g., approximate location and time) to a cloud based service as described herein for the creation of a cloud based EPL correction database as described herein.

Figure 1B:
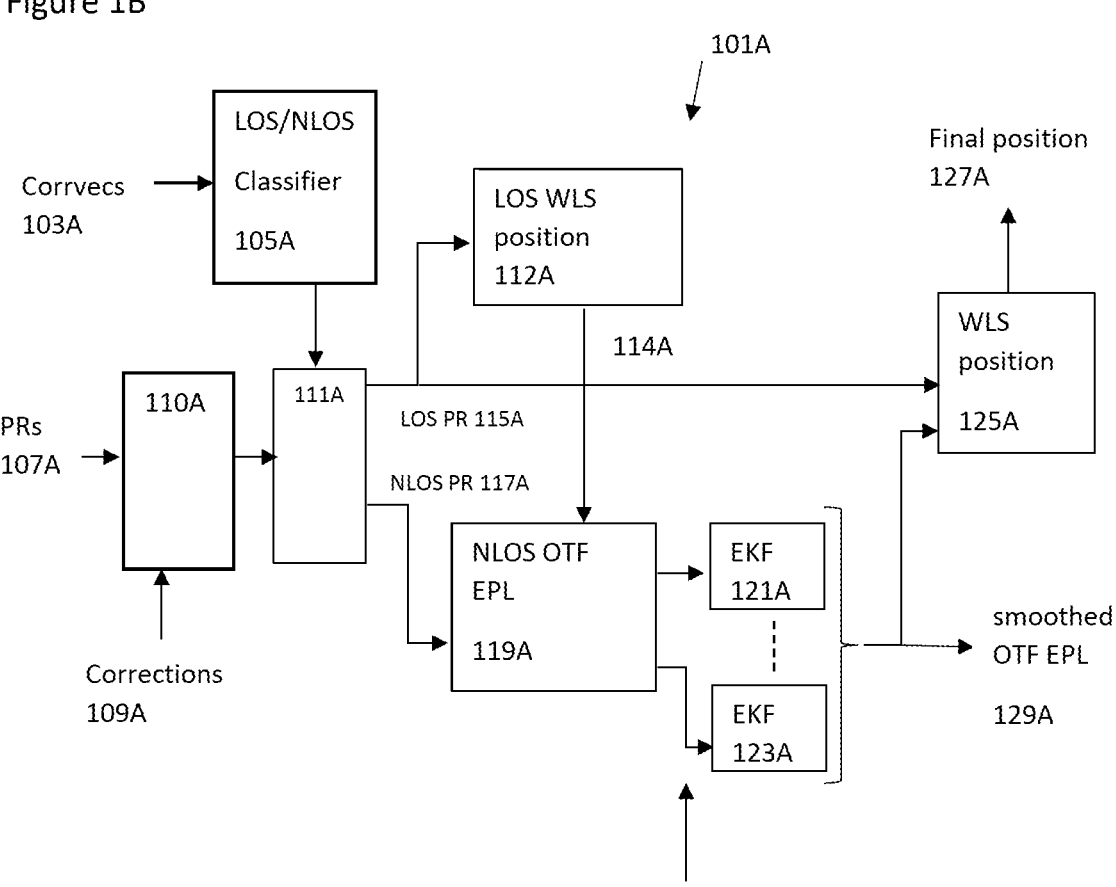
FIG. 1B is a block diagram of another system that can generate EPL corrections.

FIGS. 1B and 4B show an alternative embodiment that uses only LOS pseudoranges to compute an initial position (instead of also using a selected subset of NLOS pseudoranges). This alternative embodiment is also described in U.S. provisional patent application No. 63/365,710, filed Jun. 2, 2022, which is incorporated herein by reference. FIG. 1B shows a portion of a GNSS system than can perform the method shown in FIG. 4B. In this alternative embodiment, system 101A shown in FIG. 1B receives, in operation 425 in FIG. 4B, GNSS signals from a set of GNSS SVs and determines, in operation 427 in FIG. 4B, a set of pseudoranges (e.g., PRs 107A in FIG. 1B) from the received set of GNSS signals. The set of pseudoranges can be corrected by conventional corrections (e.g., corrections 109A shown in FIG. 1B) in one embodiment. The system 101A can also determine a set of correlation vectors 103A (in FIG. 1B) that are used as inputs to a classifier 105A to perform operation 429 in FIG. 4B. The classification of the pseudoranges can be performed by the classifier 105A shown in FIG. 1A, and the resulting classification is used to sort the pseudoranges into the two paths at the output of the selector 111A shown in FIG. 1B. The LOS pseudoranges 115A are provided to the GNSS processing logic 112A which computes an initial position 114A using only the LOS pseudoranges (in operation 431 shown in FIG. 4B), and LOS pseudoranges 115A are also provided to the GNSS processing logic 125A which computes a final position 127A using, for example, a weighted least squares algorithm or similar algorithms to compute a position from a set of pseudoranges and SV ephemeris data. The NLOS OTF processing logic 119A in FIG. 1B computes (in operation 433 in FIG. 4B) estimated EPL correction values for each NLOS pseudorange in the set of NLOS pseudoranges 117A; these estimated EPL correction values can be based on the initial position 114A as described herein (e.g., the initial position 114A and the SV ephemeris data for each SV in the set of NLOS pseudoranges can be used to determine the estimated true range for each such SV, and the difference between this estimated true range and the corresponding NLOS pseudorange for the SV can be the estimated EPL correction for the SV's measured NLOS pseudorange). In one embodiment, the estimated EPL correction values from the output of the NLOS OTF processing logic 119A can be smoothed over several GNSS epochs using extended Kalman filters 121A through 123A (representing a set of EKFs, with one EKF for each SV in the set of NLOS pseudoranges); these smoothed EPL corrections values 129A can be used to correct the NLOS pseudoranges which can then be provided as inputs to the WLS position algorithm computed by the GNSS processing logic 125A. The GNSS processing logic 125A can, in operation 435 in FIG. 1B, compute a second or final position 127A which is computed, in one embodiment, using a WLS algorithm that uses the LOS pseudoranges (after corrections 109A) and the NLOS pseudoranges (after corrections 109A and after EPL corrections 129A) to compute the final position 127A. The WLS algorithm used by the GNSS processing logic 125A can use the LOS pseudoranges and the NLOS pseudoranges from the current GNSS epoch while the smoothed EPL corrections were generated from one or more prior GNSS epochs (but used in the current GNSS epoch to correct the NLOS pseudoranges from the current GNSS epoch). The method in FIG. 4B can be repeated over time (multiple GNSS epochs of the primary PRN code) in operation 437.

Crowd Sourcing Method

Instead of using the estimated EPL in pseudo real-time, multiple EPL measurements made either at multiple epochs by the same receiver, or by a "crowd" of receivers can be combined into a more precise database of EPL corrections, such as a database of EPL corrections maintained by a cloud based system as described further below. The EPL corrections database can be considered a crowd sourced database because the data used to create the EPL corrections are generated from the crowd of GNSS receivers spread over one or more geographic regions. The cloud based system can be implemented by a set of one or more data processing systems (e.g., servers) that are coupled through one or more networks with the devices (e.g., smartphones or wearable devices such as watches or augmented reality/virtual reality glasses) that contain and embody the GNSS receivers in the "crowd".

Figure 5B:
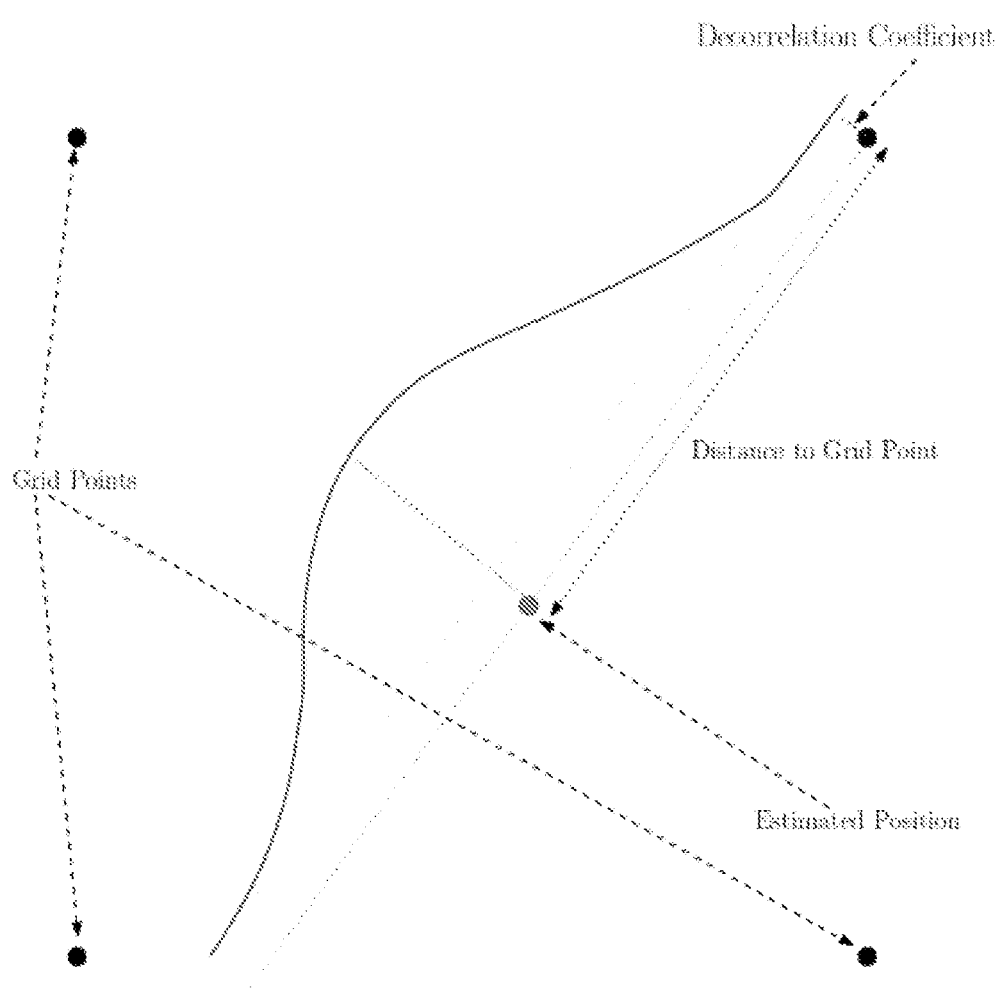
FIG. 5B shows a method for scaling down or deweighting EPL corrections when creating an EPL corrections database according to one embodiment.

The method relies on the assumption that, at a particular location, two (2) satellites at the same azimuth and elevation (or other coordinate system that defines a position in the sky relative to the local environment such as a location on the ground) will be exactly in the same configuration vs. the local buildings (and other obstructions of RF GNSS signals) and will experience the same EPL at the particular location. The time of the measurement becomes irrelevant, the characteristics of the signal are also irrelevant, provided both satellites are received on the same channel. Some details about the application of the measurements to the grid are explained in the APPENDIX 2 and shown in FIG. 5B.

In one embodiment, the crowdsourcing can be done only from dedicated receivers (able to extract the signal features, such as correlation vectors, needed for the LOS/NLOS reliable classification—see references [1] and [2] in the references section below, and thus to estimate the OTF EPLs). The database can be exploited either by the same dedicated receivers, or conventional receivers having access to the database. After a period of crowdsourcing, the accuracy expected by this method will be more accurate than the on-the-fly method (e.g., the method shown in FIG. 1A). The details of crowdsourcing and practical use of this database are described further below.

We want to pinpoint the advantages of this crowd-sourcing method vs. a geometric knowledge of the 3D location of the buildings:

The crowdsourcing is done in the radio transmission domain, not in the geometric domain followed by a conversion into a radio propagation model using a ray-tracing method or equivalent. The uncertainties in building location, and ray-tracing model algorithms are avoided. No 3D building maps and no ray-tracing techniques are needed in an embodiment that uses a crowd sourcing method.

Compared to the shadow matching or similar methods used in the past (see, for example, US published patent application US2021/0325548 by Applicant oneNav Inc.) for mitigating the MP in urban canyons, there is no need to send surveying teams on the premises (e.g., to create 3D building maps). Any change in the configuration (example: construction of a new building that changes the reflection areas) will be considered by the continuous crowdsourcing, without any physical intervention (e.g., no need to perform another survey after the new building is completed). Also, the seasonal changes (example: tree foliage) will automatically be reflected in a regularly updated database, following the slow foliage evolution.

The EPL is one way to keep track of the MP at a specific location but is highly dependent on the tracking architecture of the receiver. In practice, the crowdsourced EPL might not be usable for correcting MP in another receiver architecture. The mere improvement in receiver sensitivity might impose another tracking point and EPL estimate. An alternate solution is to crowdsource a CorrVec instead of the EPL. Corrvec is an array of complex amplitudes provided by an array of correlators, usually equally spaced in the delay dimension (at "taps"). CorrVecs are described in published US patent application publication number 2021/0325548. Any receiver of any architecture will have some notion of a CorrVec with a variable number of taps. The delay spacing between taps can be irregular, but the Crowdsourced CorrVec can be converted to a different array of delays, regularly or irregularly spaced, and can be used as a more universal "signature" of the MP.

Structure of the Database

In one implementation, the database consists of a square grid of geographical points (such as about 5 meters square grid spacing). Each point is assigned a "spherical harmonics" representation of EPL in any direction above the ground. To get an EPL estimate, the Line-of-Sight azimuth and elevation (in practice virtually constant within 200 m of position uncertainty) are estimated from the approximate location and the knowledge of the satellite almanac or ephemeris. This estimation can be exploited to compute the coefficients of hemispheric harmonics model, and the estimated EPL is obtained as an output. Spherical Harmonics are obviously not the only method to represent the EPL behavior around a point, but present an interesting data compression method. Alternatively, the database can provide a sequence of CorrVec taps, each tap value being encoded as a spherical harmonic.

The database, in one embodiment, does not need to cover all the position computation domain (e.g., only at the deep-urban canyon points that need more support than the on-the-fly estimation). It can be enhanced on-demand, without any presence on the field. A very good application is any location, with a difficult physical access, or where the establishment of 3D building maps is too expensive or not available.

Crowd-Sourcing Operation Details

A set of GNSS receivers operating in an urban canyon (or other locations) can use the on-the-fly approach to compute OTF EPL correction values as described above, and these values and the uncertainty of these values can be transmitted to a cloud based service that uses one or more servers to generate a crowd sourced EPL database from the data received from the set of GNSS receivers. The on-the-fly EPL along with its estimated error (e.g., standard deviation) is received from this set of GNSS receivers and propagated to the closest fixed predetermined geographic points from the approximate position. A de weighting factor is applied to the measurement dependent on the distance to each geographic point and square-combined to the measurement uncertainty. The weight (W)-adjusted on-the-fly EPLs are binned in small azimuth and elevation windows (also referred to as bins), no distinction is made about the time of the measurements, or the constellation of the satellite, or the signal structure, or the satellite PRN, all results are amalgamated. The size of these windows is adjusted according to the angular correlation of the on-the-fly EPL. In one embodiment, an estimate of the EPL in each window is generated as a weighted sum of each individual EPL in the bin.

Figure 2:
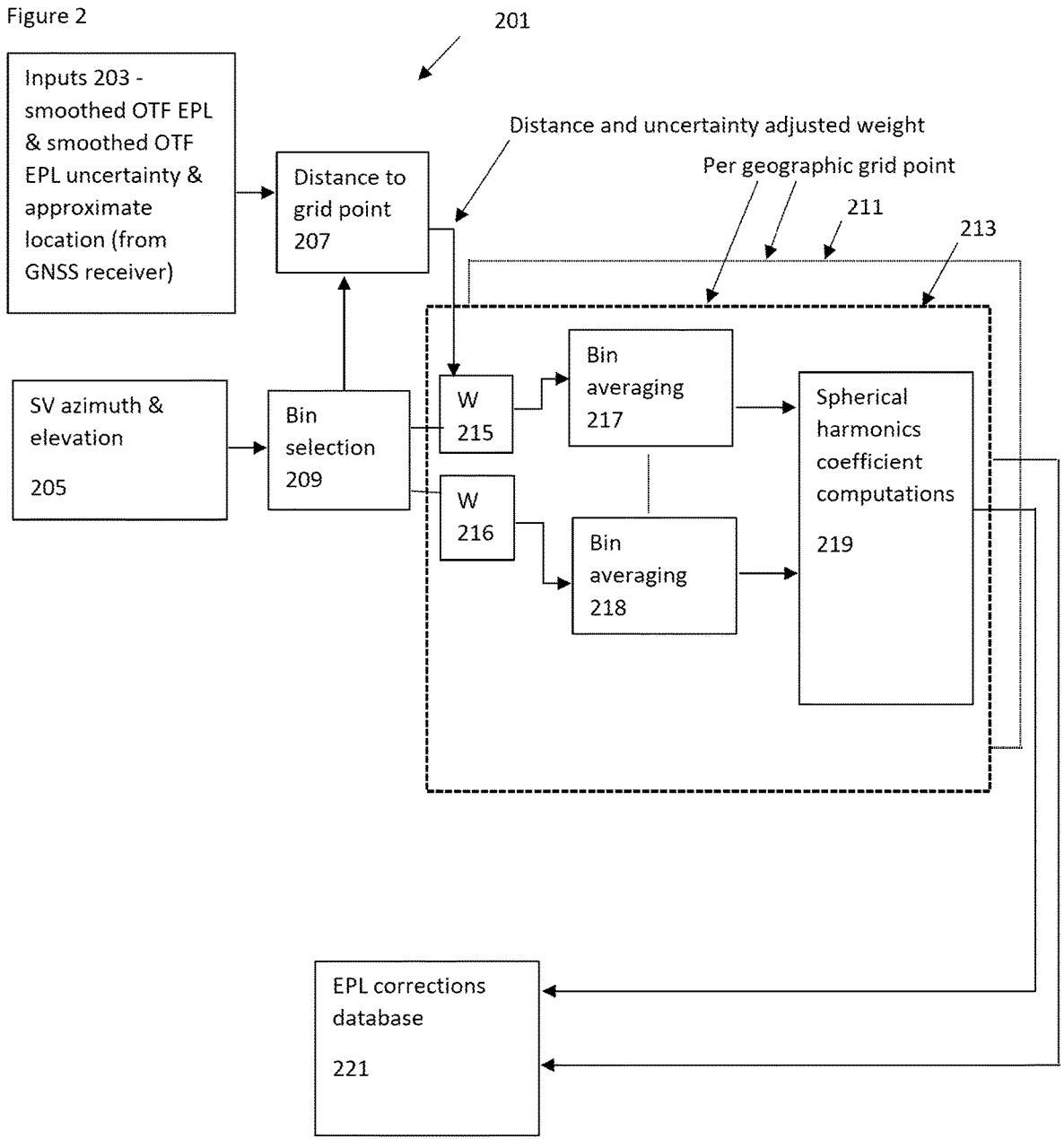
FIG. 2 is a block diagram of a cloud based system that can create a database of EPL corrections which can be used by systems containing a GNSS receiver.

FIG. 2 shows an example of a cloud based system 201 that can create a database of EPL corrections that are indexed by SV elevation and azimuth and FIG. 5A shows an example of a method for creating such database; in an alternative embodiment, the database may be at least partially implemented by a data processing system in a device (e.g., a smartphone) that includes a GNSS receiver without the use of a cloud based system. The cloud based system can be implemented by a set of one or more servers that are coupled, through one or more networks, to devices (e.g., smartphones or automobiles containing GNSS receivers) that include GNSS receivers that provide their smoothed OTF EPL corrections and other data to the cloud based system, such as the cloud based system 201 shown in FIG. 2. A set of GNSS receivers (e.g., a "crowd" of GNSS receivers) can use the embodiment shown in FIG. 1A to generate a set of smoothed EPL corrections and associated data (e.g., smoothed EPL uncertainty and time and approximate position for each EPL correction) and then transmit these smoothed EPL corrections and associated data 203 to the cloud based system 201. For example, each GNSS receiver in the "crowd" of GNSS receivers can compute a smoothed EPL correction for each NLOS PR (e.g., each selected NLOS PRs and each non-selected NLOS PRs) and the EPL uncertainty of that smoothed EPL correction and the approximate positions and times associated with the smoothed EPL corrections, and then cause the device (e.g., a smartphone, wearable device or automobile) containing the GNSS receiver to transmit this data 203 to the cloud based system 201 (which receives this data in operations 501 and 503 in operation FIG. 5A). In addition, for each smoothed EPL correction, the device containing the GNSS receiver can transmit the SV's elevation and azimuth 205 at the time and approximate position associated with the smoothed EPL corrections to the cloud based system (e.g., as in operation 505 in FIG. 5A). In an alternative embodiment, the cloud based system receives a time stamp that indicates the time of the approximate location and the cloud based system determines, from SV ephemeris data or algorithms, each SV's elevation and azimuth for the associated EPL correction at the time of the approximate location. The cloud based system 201 receives this data 203 and 205 from each GNSS receiver in the crowd of GNSS receivers and uses this received data to create the EPL database 221 that can be searched using the approximate position, SV elevation and SV azimuth; in other words, the database is searched or indexed, in one embodiment, by a bin selection that is based on approximate position, SV elevation and SV azimuth.

The cloud based system 201 can process the received data 203 and 205 by mapping (through the distance to grid point operation 207) each received approximate position to a closest grid point (in the grid of points representing locations on earth, such as locations in an urban canyon) and by selecting a bin (e.g., in operations 507 and 509 shown in FIG. 5A) out of a set of bins (by bin selection operation 209 in FIG. 2). The hemisphere of the sky is divided into bins, with each bin representing the portion of the hemisphere with a center (or centroid) of each bin defined by a particular SV elevation and azimuth; for example, each bin can be a 1 degree by 1 degree portion of the hemisphere (or smaller bins can be used such as a 0.5 degree by 0.5 degree portion for each bin), and the center (or centroid) of the bin is the index (e.g., the index are the inputs to perform lookup operations in a database to retrieve EPL corrections from the database) for any SV quantized to that bin's SV elevation and azimuth. Higher resolutions of the hemisphere produce more bins that divide the hemisphere into smaller portions; this may produce more accurate results at the expense of larger databases. An alternative embodiment can use any coordinate system (other than azimuth and elevation) that can define a position in a representation (e.g., a hemisphere) of the sky, such as a cartesian coordinate system; a polar coordinate system; a spherical coordinate system; or other coordinate systems that specify position in the representation of the sky relative to the approximate location of the GNSS receiver under the representation of the sky.

The cloud based system uses the distance between the approximate location (for each smoothed EPL correction) and the grid's center in the closest grid point (e.g., grid point 211 or grid point 213) and uses the smoothed EPL uncertainty (for each smoothed EPL correction) to compute an adjusted weight (e.g., adjusted weights 215 and 216) for each smoothed EPL correction. The weighted EPL corrections within each bin and grid point are summed together in one embodiment (e.g., in bin averaging 217 and 218) to create the final EPL correction (e.g., in operation 511 in FIG. 5A) for each bin for a grid point (e.g., an EPL correction at a grid point and for a given SV elevation and azimuth). The method is repeated, in operation 513 in FIG. 5A, over a set of one or more geographic regions to produce EPL corrections in the database that cover the geographic regions. In one embodiment, the full set of EPL corrections can then be represented (through computation 219) by a set of spherical harmonics coefficients in a spherical harmonics model, and these coefficients can be stored in the database 221 for use by GNSS receivers as described in the context of FIGS. 3 and 6.

Alternate Implementations

All on-the-fly EPL estimation, binning and averaging per bin can be done on board of the GNSS receiver (instead of a cloud based system) to create an EPL correction database that is stored locally on the GNSS receiver. Also, while feasible on-board of the GNSS receiver, the database is advantageously implemented in the cloud where several receivers can faster contribute to populating the database, with more geographic and sky position diversity and ultimately better accuracy. In one implementation, a system containing a GNSS receiver can download (and store locally) all or only certain geographic portions of an EPL corrections database for local use (at the GNSS receiver) in correcting NLOS pseudoranges. This downloading can be repeated over time as the EPL database changes over time (e.g., regular updates to the EPL database).

If the measurements and signal features needed for LOS/NLOS classification are uploaded to a cloud server, all operations of NLOS/NLOS classification, LOS position computation, and on-the-fly EPL measurement can be accomplished in the cloud. The update of the database, the conversion to Spherical Harmonics and the storage of the database is also handled in the cloud. Only the Spherical Harmonics of few geographic points neighbors of the approximate position are downloaded in real-time in the receiver for the position improvement.

Position Improvement Using the Crowd-Sourced EPL Database

The operational use of the database for positioning improvement can be as follows in one embodiment:

1. Apply the differential correction for all satellites.

2. Partition (e.g., classify) all measurements into reliable LOS and NLOS categories.

3. Compute approximate LOS position and uncertainty, only using the LOS measurements (4 minimum) or using both LOS PR measurements and selected NLOS PR measurement.

4. Compute an estimate of azimuth and elevation at the approximate position for each received satellite (in order to select the appropriate bin based on azimuth and elevation).

5. Define a subset of database grid points based on approximate LOS position and uncertainty.

6. For each grid point, extract Spherical Harmonic Coefficients from the database, and convert them into a set of EPL corrections for each satellite.

7. For each grid point, apply the EPL corrections under the hypothesis the receiver is at the exact grid point.

8. For each grid point, compute the sum of squares of pseudo range residuals:

$$zPRR = \left( \sum\nolimits_{i=1}^{n} (\rho_c - \rho_e)^2 \right) / (n - 4)$$

With:
   n the number of measurements
   $\rho_c$ the measured pseudo range
   $\rho_e$ the estimated pseudo range 9. Classify all grid points by increasing residual values.

10. Compute the final improved position by adjusting relative distance of the final position to each grid point in the inverse proportion of the sum of the squares of the residuals.

Figure 3:
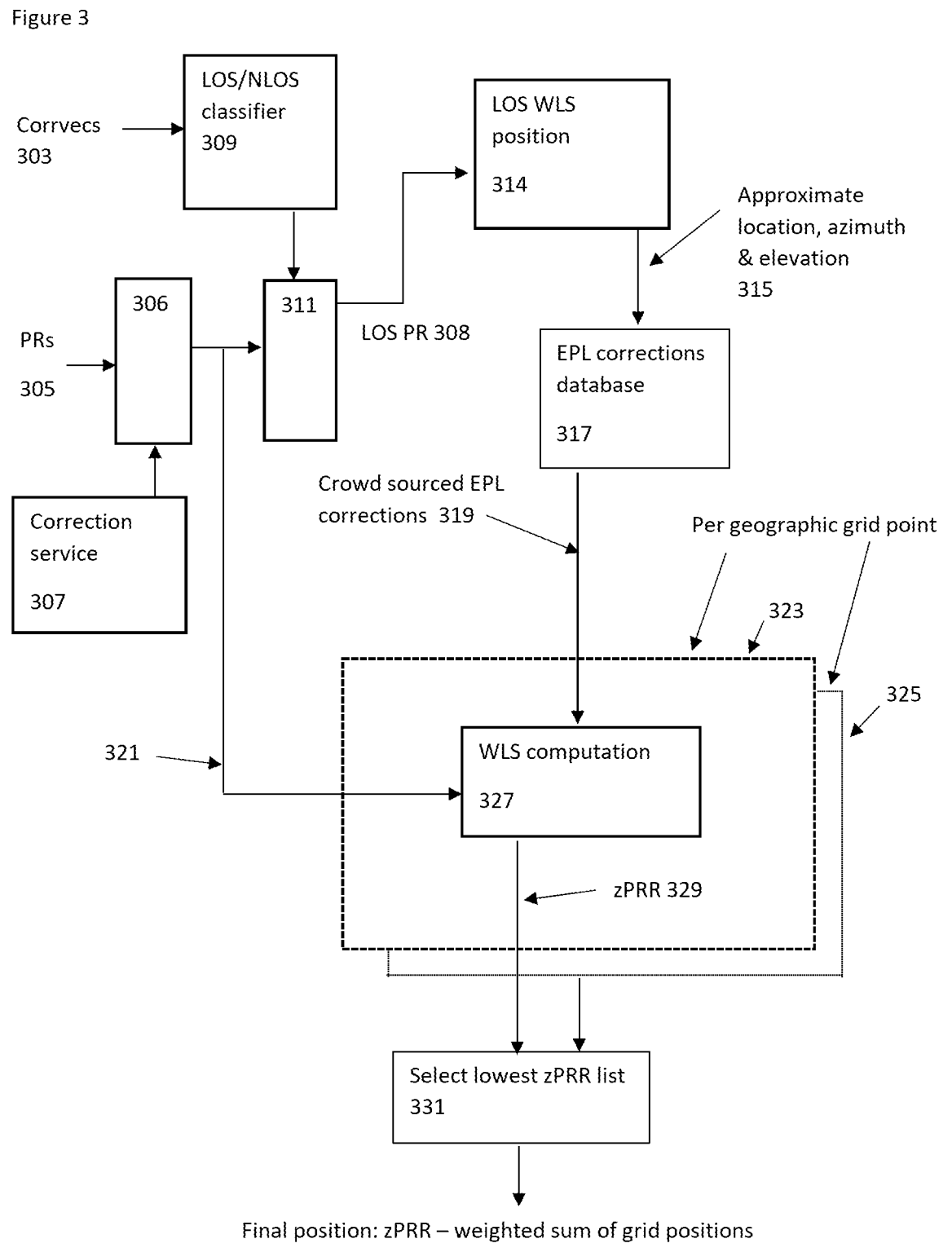
Figure 6:
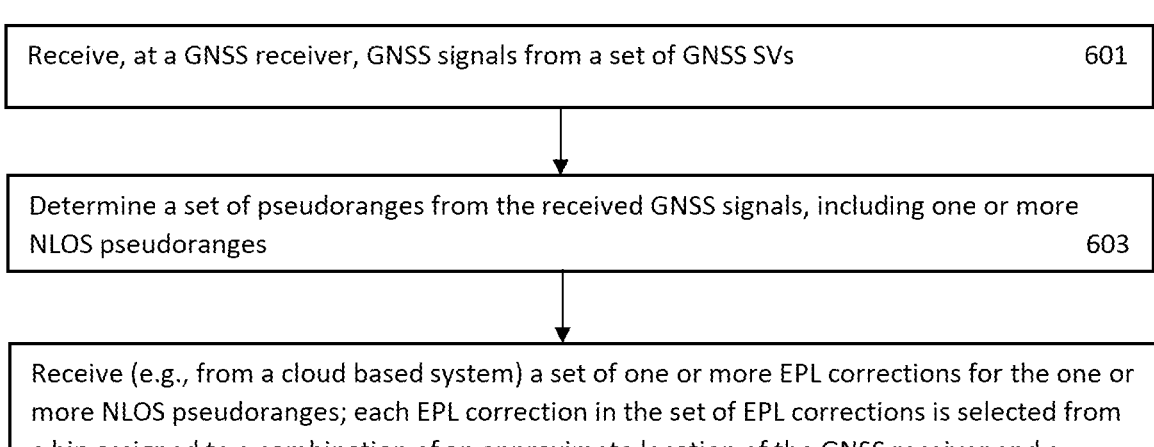
FIG. 6 is a flowchart that shows a method according to one embodiment for using an EPL corrections database.

FIG. 3 shows an example of how one or more GNSS receivers can use an EPL database (e.g., the EPL database 221 created by crowd sourced data from GNSS receivers) to extract EPL corrections from the EPL database and perform position computations with the crowd sourced EPL corrections. FIG. 6 shows an example of a method that can be performed by the GNSS receiver in FIG. 3. All of the components and operations shown in FIG. 3 can be in a GNSS receiver except for the EPL database 317 that can be hosted by a cloud based system (such as the cloud based system shown in FIG. 2); in an alternative embodiment, the EPL database may be locally stored on the GNSS receiver or a component in the device containing the GNSS receiver. The GNSS receiver in FIG. 3 can be part of a device (e.g., a smartphone, wearable device or automobile or other devices) that can communicate with the cloud based system through one or more networks to request and receive EPL corrections for pseudoranges. The GNSS receiver in FIG. 3 can receive GNSS signals and compute pseudoranges (PR 305) as shown in operations 601 and 603 in FIG. 6 and can also compute correlation vectors (CorrVecs 303 in FIG. 3). The GNSS receiver can include a LOS/NLOS classifier 309 that can classify a computed pseudorange as LOS, selected NLOS or non-selected NLOS based upon the CorrVecs 303 input; such classifiers are known in the art and may be implemented with trained neural networks or other approaches. GNSS processing logic 306 can apply conventional corrections 307 (e.g., ionospheric corrections, SV clock error corrections, etc.) to the pseudoranges 305, and these corrected pseudoranges are passed through selector 311 (which is similar to a demultiplexer) based upon data from classifier 309 so that corrected LOS pseudoranges 308 (and selected NLOS PRs in one embodiment) are provided to GNSS processing logic 314. The processing logic 314 computes an approximate position using a WLS algorithm based on the LOS pseudoranges 308 and selected LOS PRs (so the non-selected NLOS pseudoranges are not used by processing logic 314), and this approximate position, along with the SV's elevation and azimuth (at the time when the GNSS signals were acquired to derive the pseudoranges 305 for the SV), are provided to the cloud based system as index values to look up the EPL correction for the approximate location and the SV's elevation and azimuth. The GNSS receiver will provide, in one embodiment, the approximate location, SV elevation and azimuth 315 for each PR (in the set of pseudoranges 305) to be corrected by the EPL corrections 319 received from the EPL database 317. The GNSS receiver can repeat these operations for each GNSS epoch. The cloud based system receives, in one embodiment for each PR, an approximate position, SV elevation and SV azimuth, and uses these values as the index to look up the EPL correction for this inputted index. Each EPL correction for a PR is transmitted back to the GNSS receiver (e.g., through the smartphone in the device containing the GNSS receiver). The GNSS receiver receives the crowd sourced EPL corrections 319 (in operation 605 shown in FIG. 6) and uses them to correct pseudoranges in the set of pseudoranges 321 (which can be corrected PRs as shown in FIG. 3). A WLS computation unit 327 in the GNSS receiver can compute, for the appropriate geographic grid point (e.g., grid points 323 or 325), the sum of squares of pseudo range residuals (zPRR) 329 as described above and select the lowest zPRR 331 to produce a final position as described above.

Generalization of the Method to EKF (Extended Kalman Filter)

This is a proposed method to solve the less than 4 satellites situation, expected to be very common in deep urban canyons.

A generalization of the method can be used, where the position is computed with a EKF:

1. the last position is propagated from the last measurements,
2. the current LOS measurements are injected as inputs
3. new NLOS EPL estimations are made against this current position
4. new EPL estimations are injected in the per SV EPL filtering
5. NLOS PR are corrected with the output of the EPL estimators
6. Corrected NLOS PR's are input in the position EKF as measurement update.

Figure 7A:
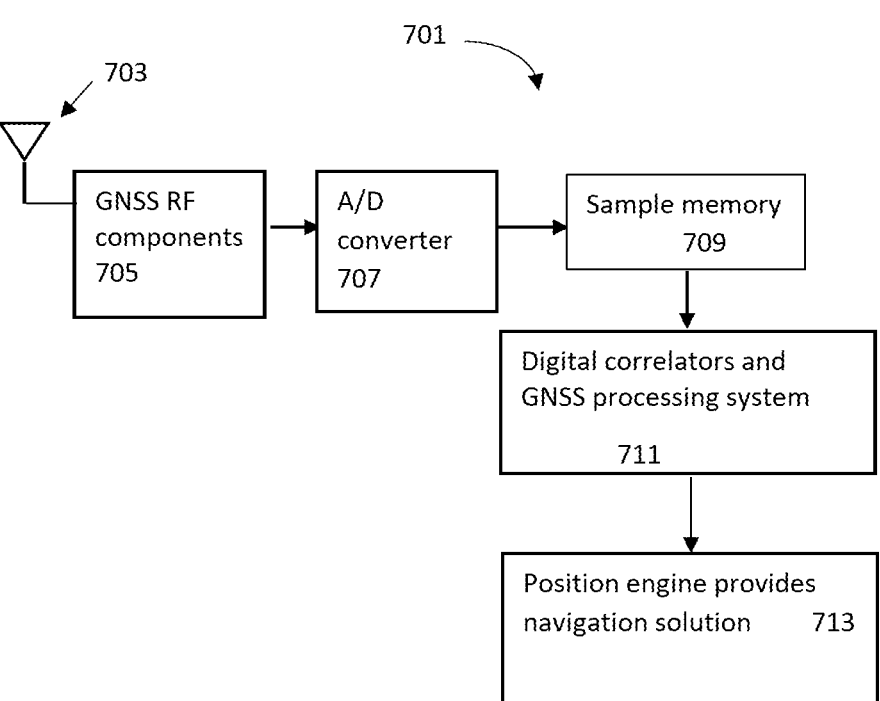
FIG. 7A shows an example of a GNSS receiver according to one embodiment.

FIG. 7A shows an example of a GNSS receiver 701 that includes one or more embodiments described herein and performs one or more of the methods described herein. For example, the GNSS receiver 701 can include the GNSS system 101 shown in FIG. 1A (and perform the method shown in FIG. 4A) or can include the GNSS system shown in FIG. 1B (and perform the method shown in FIG. 4B), and the GNSS receiver 701 can include the GNSS system shown in FIG. 3 (and perform the method shown in FIG. 6). The GNSS receiver 701 can receive GNSS signals from GNSS SVs through the one or more GNSS antennas 703; those received GNSS signals can be amplified, filtered and down converted by GNSS RF components 705 which provides an analog output to an analog-to-digital (A/D) converter 707 which digitizes the received GNSS signals. The digitized GNSS signals are then stored in a sample memory 709 for processing by a set of digital correlators and GNSS processing system 711; in one embodiment, the architecture of GNSS receiver 701 up to and including the digital correlators can be similar to one or more of the architectures of the GNSS receivers described in U.S. patent application Ser. No. 17/068,659, filed Oct. 12, 2020 by applicant oneNav, Inc. See US published application US 2022/0137236 which is a published version of this patent application. The GNSS processing system 711 is configured to perform the one or more methods described herein to generate EPL corrections and/or retrieve EPL corrections from an EPL correction database. The corrected pseudoranges can be used by the GNSS processing system 711 to generate a navigation solution 713, such as the final position 127 in FIG. 1A as described above. The GNSS processing system 711 can also use one or more of the techniques described in U.S. patent application Ser. No. 17/334,477, which was filed on May 28, 2021 by applicant oneNav Inc. and published as US published application 2021/0373179, and this patent application is hereby incorporated herein by reference. For example, the GNSS processing system 711 can use these techniques to acquire secondary code phases of the secondary codes used in certain GNSS systems such as the Galileo system of GNSS SVs in the Galileo constellation.

Figure 7B:
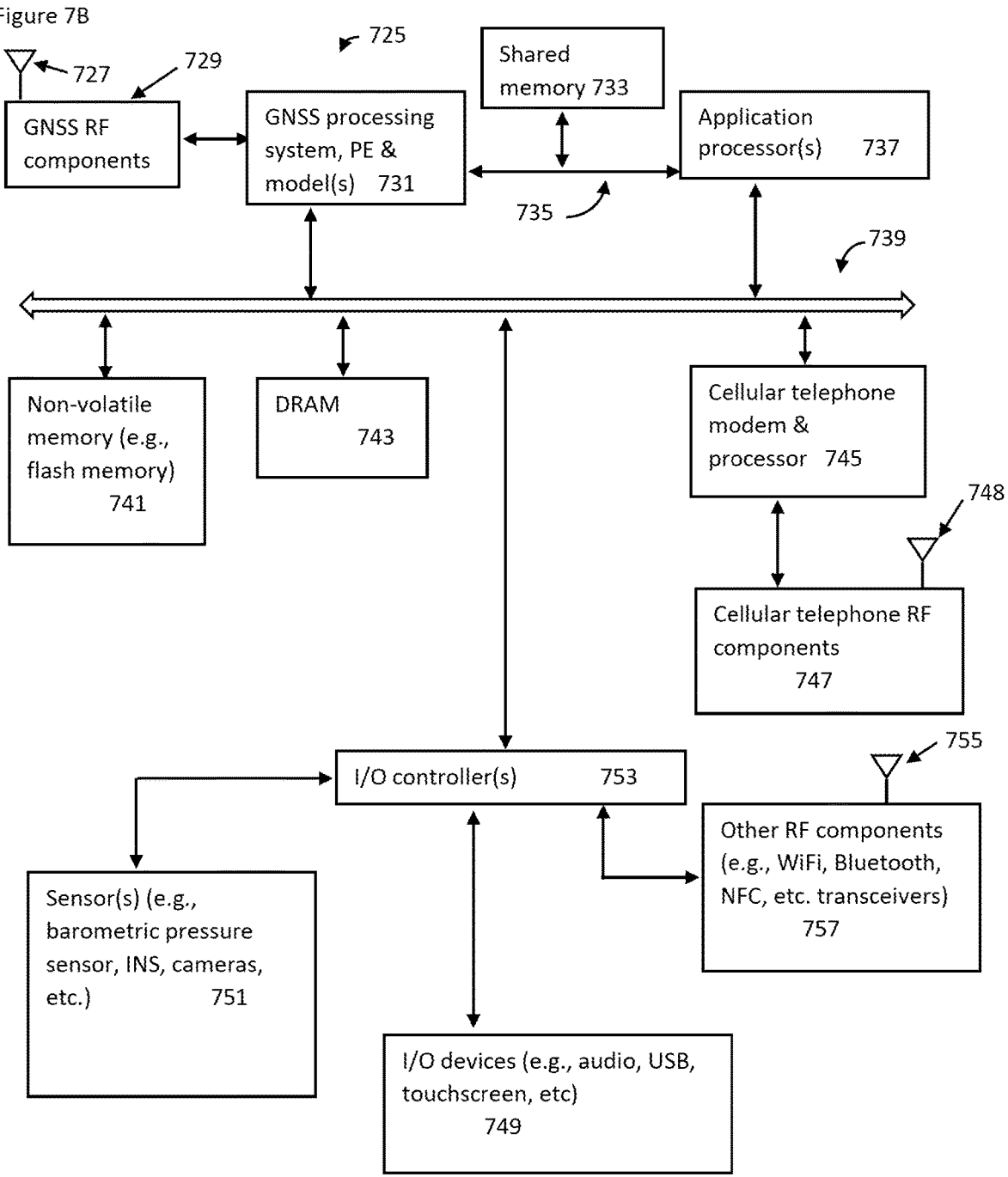
FIG. 7B shows an example of a system containing a GNSS receiver according to one embodiment.

The one or more embodiments described herein can be used in a system with other components that are coupled to a GNSS receiver that includes the one or more embodiments. Examples of such systems include, for example, smartphones, smart watches, wearables (e.g., headmounted displays or fitness wearables), internet of things (IoT) devices, vehicles (e.g., an automobile), and other devices that can include a GNSS receiver to provide position information, etc. FIG. 7B shows an example of such a system 725 which may be a smartphone or a smartwatch or other devices. The system 725 in FIG. 7B includes GNSS RF components 729 and a GNSS antenna 727 coupled to the GNSS RF components 729; the GNSS RF components 729 can include one or more low noise amplifier(s) and one or more bandpass filters and one or more downconverters and one or more analog to digital (ADC) converters (e.g., see US published patent application US 2022/0137236). In some embodiments, the system 725 can include an additional GNSS antenna (e.g., if the system includes a hybrid L1/L5 GNSS receiver that receives and processes GNSS signals from both of the L1 and L5 radio frequency bands). These GNSS RF components 729 can receive GNSS signals from GNSS SVs, through GNSS antenna 727, and amplify and create digital representations of the received GNSS signals and store them in one or more data sample memories that are accessed by the GNSS processing system 731. The GNSS processing system 731 can include all of the hardware and software used to acquire and track GNSS signals using, for example, digital correlators and tracking loops; the GNSS processing system may also include memory to store the data samples of the received GNSS signals. The digital correlators may be hardware correlators (e.g., see for example, US 2009/0213006) or fast Fourier transform based processing logic that uses discrete Fourier transforms (DFT) to correlate the received GNSS signals with locally generated PRN codes. Published US application number 2022/0137236 describes examples of the use of DFT processing to correlate received GNSS signals. The GNSS processing system 731 also includes processing logic that implements a measurement engine that processes the correlation results to compute pseudorange measurements (e.g., pseudorange measurements corrected with one or more EPL corrections as described herein) and range rate measurements, and the GNSS processing system can also include a position engine that computes positions (e.g., latitude and longitude data) using known methods, such as a weighted least squares algorithm or other known methods, to compute the position of the GNSS receiver from pseudorange measurements (e.g., pseudorange measurements corrected with one or more EPL corrections as described herein) and SV ephemeris data and optionally assistance data. The GNSS processing system 731 also extracts the ephemeris data (e.g., satellite navigation data) from the received GNSS signals. In one embodiment, the system 731 may receive the SV ephemeris data from one or more sources other than the SVs (e.g., from an assistance server as described herein). In one embodiment, the GNSS processing system 731 can include one or more trained models (e.g., trained neural networks) that provide data used by one or both of the measurement engine or the position engine. For example, the GNSS processing system 731 can include a trained model to provide a selection of SVs as described in U.S. provisional patent application No. 63/362,931 which was filed on Apr. 13, 2022 by applicant oneNav. The GNSS processing system 731 may also include a trained model that provides excess path length (EPL) corrections to correct pseudorange measurements to mitigate multipath effects; U.S. patent application Ser. No. 17/836,116, filed on Jun. 9, 2022 by applicant oneNav Inc., provides examples of such a trained model that provides EPL corrections. The GNSS processing system 731 may also include a trained model that classifies GNSS signals as either line-of-sight signals or non-line-of-sight signals. The GNSS processing system 731 can provide computed positions (e.g., latitude and longitude data) of the GNSS receiver to other components of system 725, such as the one or more application processors 737.

The GNSS processing system 731 can be coupled to the other components of system 725 through one or more buses, such as the bus 739. In one embodiment, the system 725 can include multiple buses that are coupled to each other through one or more bus interfaces as is known in the art. In one embodiment, the GNSS processing system 731 may be coupled to the one or more application processors 737 through a local bus 735 that is coupled to a shared memory 733 which can be shared between the GNSS processing system 731 and the one or more application processors 737. Published US application US 2022/0137236 provides an example of such a shared memory. In one embodiment, the GNSS processing system 731, the shared memory 733, and the one or more application processors 737 can be instantiated in a single integrated circuit which can be referred to as a system on a chip (SOC). The shared memory 733 can be used by the GNSS processing system 731 to store locally generated PRN codes for the correlation operations (if such codes are stored rather than being dynamically generated) and to store accumulation results of the correlation operations (such as accumulation results for code phase and Doppler shift hypotheses). The one or more application processors 737 can be the main processors on system 725 that execute user programs and system programs (such as telephony applications and other communication applications, web browsers, messaging applications, maps and navigation applications, productivity applications, social media applications, etc.) on the system 725. The GNSS processing system 731 and the one or more application processors 737 can operate together to provide navigation services to the user of the system 725; furthermore, the one or more application processors 737 or the GNSS processing system 731 (or both the processors 737 and the GNSS processing system 731) can utilize other components in system 725 (such as one or more sensors 751, the cellular telephone modem 745, and/or the other RF components 757) to provide assistance data that can be used with or fused with measurement data (e.g., pseudoranges to GNSS SVs) or position data from the GNSS processing system.

The system 725 includes non-volatile memory 741 which may be any form of non-volatile memory, such as flash memory; the non-volatile memory can store system software (e.g., operating system software), system data and user applications and user data. The non-volatile memory 741 is coupled to the rest of the system 725 by bus 739. The system 725 includes DRAM 743 (dynamic random access memory) which can be considered the main memory of the system 725; it stores loaded and running user and system applications and stores system and user data as is known in the art. The DRAM 743 is coupled to the rest of the system 725 by bus 739. The system 725 also includes a cellular telephone implemented by cellular telephone modem and processor 745 and cellular telephone RF components 747 and antenna 748. The cellular telephone can be used to request and receive GNSS assistance data (e.g., satellite almanac data, SV ephemeris data, correction data such as ionospheric corrections, etc.) from one or more assistance servers. The cellular telephone may also be used by the user for communication, including phone calls, text messaging, social media applications, internet applications, etc.

The system 725 also includes one or more conventional input/output (I/O) controllers 753 that couple zero or more input devices and zero or more output devices to the rest of the system 725. The I/O controllers 753 can be conventional I/O controllers used to interface an input or output device to the rest of the system 725. Some of the input devices may be sensors 751 that can provide assistance data that is used when computing or determining a position. This assistance data can be combined with GNSS measurement data (e.g., pseudoranges) or fused with a position solution from a GNSS position engine. For example, the sensors 751 may include a barometric pressure sensor that can be used to provide an estimate of the altitude of the system 725 as is known in the art. This altitude can be used by the position engine when computing a weighed least squares solution (e.g., the altitude from the barometric pressure sensor can provide the initial estimated altitude value in the weighted least squares algorithm). This altitude from the barometric pressure sensor may also be used to provide a measure of the reliability of the altitude computed from each subset of 4 SVs (e.g., in an implementation that uses a RANSAC or machine learning based RANSAC approach to select SVs for use in a position solution algorithm); for example, the altitude from the barometric sensor may be compared to the altitude from each RANSAC subset (e.g., compute the difference between the two altitude values), and if the difference (for a particular RANSAC subset) exceeds a threshold value, the altitude from the particular subset is deemed not reliable or not meaningful while if the difference is less than or equal to the threshold value then the altitude computed from the particular subset is considered reliable or meaningful. In one embodiment, the barometric pressure sensor may be calibrated or corrected by data from an assistance service which can account for current weather and environmental conditions (using techniques known in the art) in the vicinity of the system 725 to provide a more accurate altitude. The sensors 751 may also include an inertial navigation system (INS) or dead reckoning system that can, once initialized with a correct position, provide position data about the location of the system 725 as it moves; the INS can include accelerometers and gyro devices that measure movement of the system 725 over time. Data from the INS can be combined with or fused with a position solution from a GNSS position engine using techniques known in the art. The I/O devices 749 can also include conventional input/output devices such as audio devices (e.g., speakers and microphone), a USB interface, and a touchscreen that receives touch inputs and displays images, etc. The I/O output devices may also include other RF systems 757 with one or more antennas 755; these other RF systems may include one or more of conventional WiFi (or other wireless local area networks), Bluetooth or NFC (near field communication) RF transceivers. These other RF systems may also be used in some embodiments to deliver assistance data to the GNSS processing system or the application processors to determine a position of the system 301. For example, the WiFi transceiver may deliver assistance data (e.g., SV almanac data) to the GNSS processing system 731 and may also supply an approximate location to the GNSS processing system 731 and/or the one or more application processors (e.g., using the name (e.g., SSID) of the WiFi access point to look up the approximate location of the WiFi access point from one or more databases that are known in the art).

Figure 8:
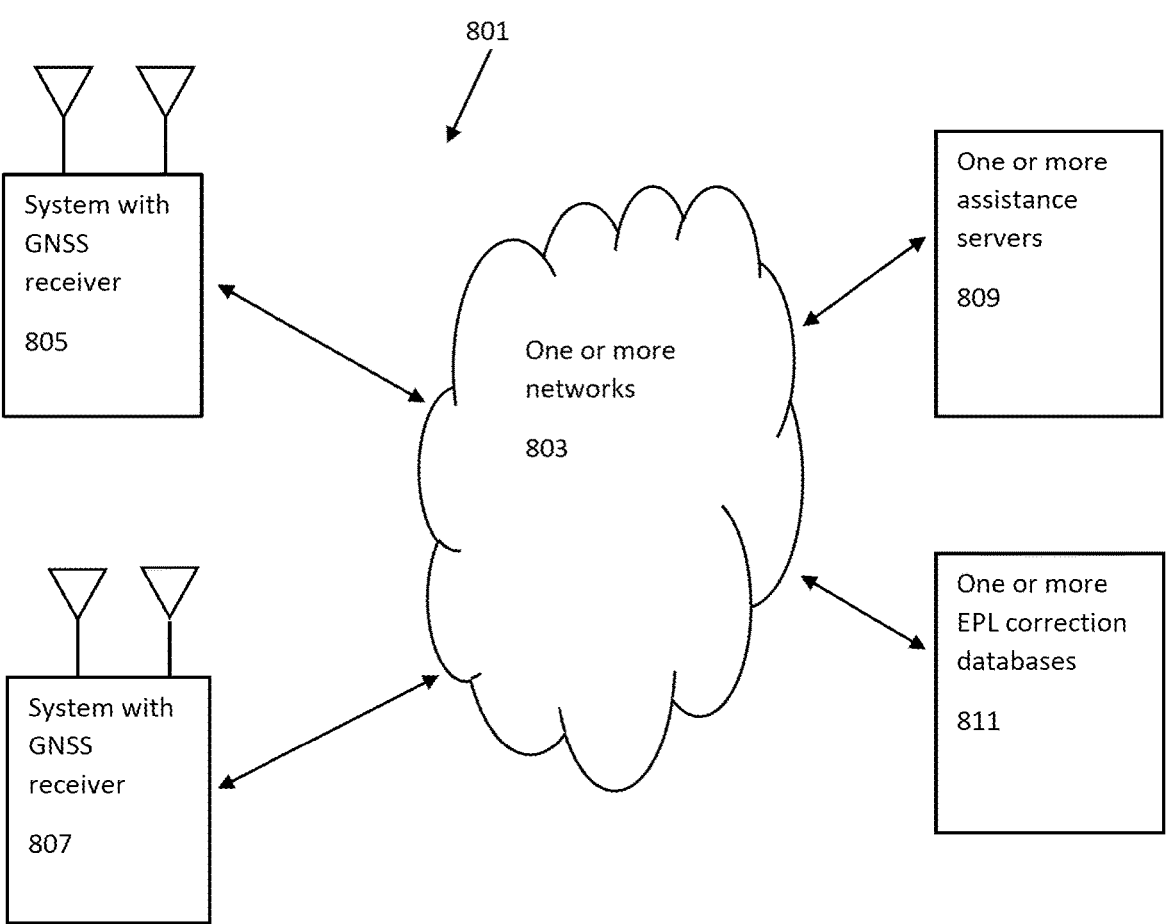
FIG. 8 shows an example of a system containing one or more assistance servers which can include or be coupled to one or more EPL correction databases.

FIG. 8 shows an example of a system 801 for delivering assistance data to one or more systems 805 and 807 that each contain a GNSS receiver. The system 801 can use one or more networks 803 to deliver assistance data and provide location assistance services to the systems 805 and 807. The one or more networks 803 can include one or more cellular telephone networks, one or more wired telephone networks, one or more wired Ethernet networks, one or more optical fiber networks, one or more WiFi networks, the internet, satellite communication networks, and one or more other networks and communication media known in the art. The one or more networks 803 can couple the systems 805 and 807 to the one or more assistance servers 809 and one or more EPL correction databases 811. The systems 805 and 807 represent two of potentially many (e.g., hundreds of millions) systems, each containing a GNSS receiver and one or more RF transceivers; each of the systems 805 and 807 can be an instantiation of an embodiment of the system 725 shown in FIG. 7B. For example, system 805 may be a smartphone or an IoT device and system 807 may be a smartwatch or a component in a vehicle (e.g., an automobile). The one or more RF transceivers in each of systems 805 and 807 can communicate, through the one or more networks 803, with the one or more assistance servers 809 and the one or more EPL correction databases 811 to receive assistance data and assistance services from these servers 809 and 811. The one or more assistance servers 809 can provide a variety of assistance services and data depending on the embodiment. For example, the one or more assistance servers 809 can provide one or more of: SV almanac data, SV ephemeris data, Doppler data for SVs in view of a GNSS receiver, time assistance data (e.g., network time), ionospheric correction data, clock bias or error data for SVs, barometric pressure sensor calibration or correction data, and WiFi position look up data based upon the name of the WiFi access point. In one embodiment, a system (e.g., system 805) can request one or more assistance data from the one or more assistance servers 809 and receive the assistance data (e.g., assistance data based upon an approximate location provided by the system to the one or more assistance servers). The system (e.g., system 805) can also use the assistance data to produce a GNSS position solution. This assistance data can be used in methods known in the art to acquire GNSS signals and also correct GNSS measurements such as pseudorange measurements. In one embodiment, the systems 805 and 807 can also use assistance services from the one or more EPL correction databases 811 to correct NLOS pseudoranges as described in this disclosure. In one embodiment, the one or more EPL correction databases 811 can be created from crowd sources (e.g., EPL corrections from a set of GNSS receivers operating in one or more environments such as urban canyons over a period of time) as described herein and shown in FIG. 5A. The EPL correction database 221 in FIG. 2 and the EPL correction database 317 in FIG. 3 are representative instantiations of the one or more EPL correction database 811. The one or more EPL corrections databases 811 can then be used to provide EPL corrections to one or more systems containing a GNSS receiver as described herein and shown in FIG. 6. Thus, the system 801 can provide both EPL corrections and other GNSS assistance data to one or more GNSS receivers. In one embodiment, the assistance servers 809 and the EPL correction databases 811 may be combined together into a single system of one or more servers.

What is claimed is:

1. A method of operating a global navigation satellite system (GNSS) system, the method comprising:

receiving a set of estimated excess path lengths (EPLs) from one or more GNSS receivers, each of the estimated EPLs associated with an approximate location of the one or more GNSS receivers and a GNSS satellite's (SV's) position in a representation of sky above the approximate location at the approximate location at a time when pseudoranges were collected to determine the approximate location;

receiving the approximate location for each estimated EPL;

receiving or determining the GNSS SV's position in the representation of sky at the time and the approximate location;

selecting a bin based on the SV's position in the representation and the approximate location;

assigning one or more of the estimated EPLs to the selected bin;

determining, for the selected bin, an adjusted EPL value based on a set of estimated EPLs assigned to the selected bin.

2. The method as in claim 1, wherein the method is performed in a cloud based system that communicates with systems containing the one or more GNSS receivers and wherein the position of a GNSS SV is specified in a coordinate system that is one of: (a) azimuth and elevation; (b) a cartesian coordinate system; (c) a polar coordinate system; (d) a spherical coordinate system; or other coordinate systems that specify position relative to the approximate location.

3. The method as in claim 2, wherein the cloud based system further receives estimated EPL uncertainty for each EPL in the set of estimated EPLs.

4. The method as in claim 2, wherein the elevation and azimuth for each SV is determined from SV ephemeris data for each SV.

5. The method as in claim 4, wherein the assigning is based on a match between an estimated EPL's associated SV elevation and azimuth and a bin's elevation and azimuth and approximate location.

6. The method as in claim 5, wherein the method further comprises:

storing the adjusted EPL value in a database that is indexed by several precise grid locations and SV elevation and SV azimuth.

7. The method as in claim 6, wherein the adjusted EPL is computed as a weighted sum of the set of estimated EPLs assigned to the selected bin.

8. The method as in claim 1, wherein the method further comprises:

transmitting the adjusted EPL to another GNSS receiver for use in the another GNSS receiver to correct non-line of sight (NLOS) pseudoranges using the adjusted EPL.

9. The method as in claim 1, wherein the method further comprises:

transmitting the adjusted EPL to one of the one or more GNSS receivers for use in the one of the one or more GNSS receivers to correct non-line of sight (NLOS) pseudoranges using the adjusted EPL.

* * * * *